(12) United States Patent  
Keates et al.

(10) Patent No.: US 9,599,041 B2  
(45) Date of Patent: Mar. 21, 2017

(54) IDENTIFYING A FUEL TYPE

(71) Applicant: Lysanda Limited, Colchester, Essex (GB)

(72) Inventors: John Keates, St. Neots (GB); Glen Tunstall, Ipswich (GB); Craig Barry, Cambridge (GB)

(73) Assignee: Tantalum Innovations Limited, UxBridge, Middlesex (GB)

( * ) Notice: Subject to any disclaimer, the term of this patent is extended or adjusted under 35 U.S.C. 154(b) by 0 days.

(21) Appl. No.: 14/837,236

(22) Filed: Aug. 27, 2015

(65) Prior Publication Data

US 2016/0160770 A1 Jun. 9, 2016

Related U.S. Application Data

(63) Continuation of application No. 14/009,766, filed as application No. PCT/GB2012/050780 on Apr. 5, 2012, now Pat. No. 9,129,456.

(30) Foreign Application Priority Data

Apr. 6, 2011 (GB) .................................. 1105830.2  
Jan. 13, 2012 (GB) .................................. 1200564.1  
(Continued)

(51) Int. Cl.  
*F02D 35/00* (2006.01)  
*G01F 9/00* (2006.01)  
(Continued)

(52) U.S. Cl.  
CPC ........ *F02D 35/023* (2013.01); *B60R 16/0236* (2013.01); *F02D 35/025* (2013.01);  
(Continued)

(58) Field of Classification Search  
IPC ................................................ F02P 5/00,5/045  
See application file for complete search history.

(56) References Cited

U.S. PATENT DOCUMENTS 4,128,005 A 12/1978 Arnston et al.  
4,175,427 A 11/1979 Blanke  
(Continued)

FOREIGN PATENT DOCUMENTS

EP 0671617 A2 9/1995  
EP 0816820 A2 5/1997  
(Continued)

OTHER PUBLICATIONS

European Patent Office Search Report for Application No. GB0510355.1.  
(Continued)

*Primary Examiner* — Yonel Beaulieu  
(74) *Attorney, Agent, or Firm* — Crawford Maunu PLLC

(57) ABSTRACT

Aspects of the disclosure are directed to estimating the type fuel used by a vehicle. As may be implemented in accordance with one or more embodiments, a type of fuel burned by an engine in a vehicle is estimated by obtaining output parameters of an on board diagnostic (OBD) system of the vehicle. Respective estimates of the fuel type are generated based on the output parameters, using a different fuel type identifying method for each respective estimate, and the fuel type is determined based on the respective estimates.

20 Claims, 18 Drawing Sheets

(30) Foreign Application Priority Data

Feb. 10, 2012 (GB) .................................. 1202342.0
Feb. 21, 2012 (GB) .................................. 1202958.3

(51) Int. Cl.
| | |
|---|---|
| F02D 35/02 | (2006.01) |
| F02D 41/08 | (2006.01) |
| B60R 16/023 | (2006.01) |
| G07C 5/00 | (2006.01) |
| G07C 5/08 | (2006.01) |
| F02D 41/00 | (2006.01) |

(52) U.S. Cl.
CPC ........... *F02D 41/08* (2013.01); *F02D 41/086* (2013.01); *G01F 9/001* (2013.01); *G07C 5/004* (2013.01); *G07C 5/08* (2013.01); *G07C 5/0808* (2013.01); *F02D 41/0025* (2013.01)

(56) References Cited

U.S. PATENT DOCUMENTS

| | | | |
|---|---|---|---|
| 4,439,158 A | 3/1984 | Weber | |
| 4,494,404 A | 1/1985 | Strifler | |
| 4,523,457 A | 6/1985 | Bayer et al. | |
| 4,817,418 A | 4/1989 | Asami et al. | |
| 4,989,146 A | 1/1991 | Imajo | |
| 5,038,289 A | 8/1991 | Abe | |
| 5,113,804 A | 5/1992 | Kraus et al. | |
| 5,365,436 A | 11/1994 | Schaller et al. | |
| 5,400,018 A | 3/1995 | Scholl et al. | |
| 5,431,042 A | 7/1995 | Lambert et al. | |
| 5,481,906 A | 1/1996 | Nagayoshi et al. | |
| 5,583,765 A | 12/1996 | Kleehammer | |
| 5,589,629 A | 12/1996 | Quinn | |
| 5,750,886 A | 5/1998 | Lambert et al. | |
| 5,781,700 A | 7/1998 | Puskorius et al. | |
| 5,941,918 A | 8/1999 | Blosser | |
| 6,053,151 A | 4/2000 | Cook et al. | |
| 6,064,970 A | 5/2000 | McMillan et al. | |
| 6,164,063 A | 12/2000 | Mendler | |
| 6,230,694 B1 | 5/2001 | Cook et al. | |
| 6,256,594 B1 | 7/2001 | Yamamoto et al. | |
| 6,295,492 B1 | 9/2001 | Lang et al. | |
| 6,308,130 B1 | 10/2001 | Vojtisek-Lom | |
| 6,366,207 B1 | 4/2002 | Murphy | |
| 6,435,019 B1 | 8/2002 | Vojtisek-Lom | |
| 6,438,472 B1 | 8/2002 | Tano et al. | |
| 6,594,579 B1 | 7/2003 | Lowrey et al. | |
| 6,595,043 B2 | 7/2003 | Jaye | |
| 6,604,033 B1 | 8/2003 | Banet et al. | |
| 6,745,151 B2 | 6/2004 | Marko et al. | |
| 6,941,750 B2 | 9/2005 | Boretto et al. | |
| 7,069,126 B2 | 6/2006 | Bernard | |
| 7,206,689 B1 | 4/2007 | Johnson | |
| 7,263,433 B2 | 8/2007 | Surnilla et al. | |
| 7,818,098 B2 | 10/2010 | Koepf et al. | |
| 7,970,496 B2 | 6/2011 | Koepf et al. | |
| 8,229,693 B2 | 7/2012 | Willard et al. | |
| 8,364,339 B2 | 1/2013 | Willard et al. | |
| 8,437,903 B2 | 5/2013 | Willard | |
| 2001/0025221 A1 | 9/2001 | Klein | |
| 2002/0077781 A1 | 6/2002 | Liebl et al. | |
| 2002/0078692 A1 | 6/2002 | Jay et al. | |
| 2002/0093201 A1 | 7/2002 | Soucy | |
| 2003/0074118 A1 | 4/2003 | Rogg et al. | |
| 2003/0093217 A1 | 5/2003 | Petzold et al. | |
| 2003/0136177 A1 | 7/2003 | Hendren et al. | |
| 2003/0216889 A1 | 11/2003 | Marko et al. | |
| 2004/0034460 A1 | 2/2004 | Folkerts et al. | |
| 2004/0145461 A1 | 7/2004 | Sandberg et al. | |
| 2005/0137757 A1 | 6/2005 | Phelan et al. | |
| 2006/0025897 A1 | 2/2006 | Shostak et al. | |
| 2006/0030980 A1 | 2/2006 | St. Denis | |
| 2006/0116811 A1 | 6/2006 | Willard | |
| 2006/0145537 A1 | 7/2006 | Escott | |
| 2006/0173602 A1 | 8/2006 | Graf et al. | |
| 2007/0078556 A1 | 4/2007 | Salman et al. | |
| 2007/0276582 A1 | 11/2007 | Coughlin | |
| 2008/0015748 A1 | 1/2008 | Nagy | |
| 2008/0115486 A1* | 5/2008 | Yurgil | F01N 11/007 60/277 |
| 2008/0120175 A1 | 5/2008 | Doering | |
| 2008/0242504 A1 | 10/2008 | Kraemer et al. | |
| 2008/0255753 A1* | 10/2008 | Spivak | F02D 41/0025 701/103 |
| 2008/0262712 A1 | 10/2008 | Duty et al. | |
| 2008/0270009 A1 | 10/2008 | Spivak | |
| 2008/0319605 A1 | 12/2008 | Davis | |
| 2009/0043467 A1 | 2/2009 | Filev et al. | |
| 2009/0326753 A1 | 12/2009 | Chen et al. | |
| 2010/0102945 A1 | 4/2010 | Watson et al. | |
| 2011/0251816 A1 | 10/2011 | Tracey | |
| 2011/0288721 A1* | 11/2011 | Christensen | G06Q 20/40 701/29.5 |
| 2012/0296549 A1 | 11/2012 | Adams | |
| 2013/0096895 A1 | 4/2013 | Willard et al. | |
| 2013/0146024 A1* | 6/2013 | Cunningham | F02D 41/0255 123/406.53 |
| 2013/0261942 A1 | 10/2013 | McQuade et al. | |
| 2014/0214311 A1 | 7/2014 | Stevens et al. | |
| 2014/0229087 A1 | 8/2014 | Keates et al. | |

FOREIGN PATENT DOCUMENTS

| | | |
|---|---|---|
| EP | 1069422 A1 | 1/2001 |
| EP | 1386776 A2 | 2/2004 |
| GB | 2209854 A | 5/1989 |
| GB | 2327511 A | 1/1999 |
| GB | 2395565 A | 5/2004 |
| GB | 2410560 A | 8/2005 |
| GB | 2451732 A | 11/2009 |
| WO | 9504878 A | 2/1995 |
| WO | 9613014 A | 5/1996 |
| WO | 9906681 A1 | 2/1999 |
| WO | 0155690 A1 | 8/2001 |
| WO | 03058188 A2 | 7/2003 |
| WO | 2007030267 | 3/2007 |
| WO | 2008087541 A1 | 7/2008 |

OTHER PUBLICATIONS

European Patent Office Search Report for Application No. GB0425964.4.

* cited by examiner

IDENTIFYING A FUEL TYPE

FIELD OF THE INVENTION

This invention relates to an apparatus and method for estimating the fuel consumption of a vehicle using on-board diagnostics for the vehicle.

In particular, the invention relates to measurement of fuel consumption, of vehicles. We will describe an apparatus and method for means for estimating fuel consumption and/or emissions, for land vehicles, including an apparatus and method for dynamically providing an accurate estimate of fuel consumption, and/or emissions, of a particular vehicle and driver, during the course of a journey, dependent on a combination of characteristics of the particular land vehicle, driver behaviour, and journey as the journey progresses.

BACKGROUND

In our earlier patents and patent applications we described devices and methods for determining fuel consumption and/or emissions for land vehicles ("vehicles") using signals obtained from the vehicle's engine management system through the on-board diagnostics port (OBD, OBDII, CAN and similar herein referred to as the 'OBD port'). Often the required data is not available, or not available in a readily usable form, from the OBD port, and in our patent application (PCT no. WO2008/146020) we describe how other signals from the engine management system can be identified and used to determine fuel consumption and/or emissions values. Such information can also be used to infer driver behaviour which can be used for driver monitoring or training.

In some instances, not only some information required to perform the fuel/emissions calculations may not be available, but can even be blocked by the vehicle manufacturer. In these instances another approach is required.

There are many occasions, and many persons and entities, who would find it useful to have access to accurate predictions of fuel consumption of a vehicle on an instant to instant basis during the course of a journey. Such predictions would need to reflect the characteristics of the particular vehicle being driven and the behaviour of the driver during the course of the journey, and these characteristics would be influenced by the characteristics of the journey.

Attempts have been made to provide estimates of fuel consumption and emissions but tend to be based on averages and generalities rather than specifics of each vehicle, driver and journey, utilised on an instant to instant basis.

It would be helpful to have accurate values for fuel consumption during the course of a journey dependent on characteristics of the vehicle, driver behaviour, and journey, for example for fleet owners, haulage and like companies, and insurance companies, among others, to best manage their business.

The present invention seeks to provide such accurate values.

SUMMARY OF THE INVENTION

According to a first aspect, the present invention comprises a method of estimating the fuel consumption of a vehicle said method comprising the steps of estimating an overall power of said vehicle, by estimating a rolling power component, an aerodynamic resistance component and an acceleration component, using at least one parameter obtained from an on board diagnostic system of the vehicle; determining the type of fuel used by the vehicle; and estimating said fuel consumption by summing said components of said overall power and dividing by the energy value of said fuel type and by a predetermined engine efficiency value.

Preferably, the rolling power component is estimated using an estimated value of mass of the vehicle and/or the aerodynamic resistance is estimated using an estimated value of the frontal area of the vehicle. Preferably, the steps of estimating said vehicle mass or said frontal area comprises the step of identifying qualifying periods in which at least one motion parameter is within a predetermined range of values associated with that parameter. Preferably, the step of estimating said vehicle mass comprises the step of determining a weighted or moving average value of vehicle acceleration readings taken during qualifying periods and/or the step of determining a weighted or moving average value of overall power readings taken during qualifying periods.

Preferably, one of said motion parameters for identifying said qualifying period for estimating vehicle mass consists of said vehicle acceleration and/or one of said motion parameters for identifying said qualifying period for estimating frontal area consists of said vehicle acceleration. Preferably, the criterion for identifying said qualifying period is that said vehicle acceleration is above a predetermined threshold, said threshold being chosen to identify near peak acceleration and/or is between predetermined thresholds, said thresholds being chosen to identify periods of near steady state motion. Preferably the method further comprises the step of identifying an engine load reporting strategy for said vehicle, using at least one OBD parameter.

Preferably, the step of identifying said engine load reporting strategy comprises the steps of obtaining said engine load and said engine speed and comparing said engine load with an engine load threshold associated with said engine speed. Preferably, the engine load threshold is chosen to identify periods in which said engine is idling. Preferably, a force provided to cranks of said vehicle is estimated using an empirically derived relationship between force and engine size.

Preferably, the method further comprises a method for discovering which of a plurality of possible engine load reporting strategies is used by an On-board Diagnostics system in a vehicle with an engine, comprising examining On-board Diagnostics system parameters, and determining the engine load when the engine is operating in such a manner as to substantially maximise the difference between the engine load values which would be produced by the different engine load reporting strategies.

Preferably, the method further comprises identifying periods in which said engine is idling as to substantially maximise the difference between the engine load values which would be produced by the different engine load reporting strategies.

Preferably, periods in which said engine is idling are identified by using said On-board Diagnostics system parameters and/or by comparing said engine speed with an idling speed threshold.

Preferably, the method further comprises of adjusting said idling threshold speed to allow for a time for which said engine has been running and/or to allow for an engine temperature and/or to allow for an engine capacity and/or to allow for a fuel type of said engine.

Preferably, the method further comprises said step of performing a check to discover whether said vehicle is being held in a stationary state by means of engaging a clutch plate. Preferably, said check is performed by comparison of a reported engine load with an engine load threshold. Preferably, the method further comprises performing a check that said engine is running. Preferably, the method further comprises performing a persistency check on said discovered reporting strategy.

Preferably, the method further comprises using of a latch circuit to store an indicator as to said discovered reporting strategy.

Preferably, a speed of said vehicle is used in discovering said reporting strategy.

Preferably the method further comprises a method of estimating an effective frontal area or aerodynamic resistance of a vehicle including an engine comprising; at a substantially constant speed of the vehicle determining the total power of the engine and determining the rolling resistance power to overcome the rolling resistance of the vehicle at that substantially constant speed; subtracting the determined rolling resistance power from the determined total current power to determine the aerodynamic resistance of the vehicle or the effective frontal area.

Preferably, the method further comprises identifying periods in which said vehicle is travelling at a substantially constant speed. Preferably, the step of identifying said periods of substantially constant speed comprises use of on board diagnostic system output and/or use of one or more of a vehicle speed, a vehicle acceleration, an engine speed and an engine load and/or comparing one or more of vehicle speed, vehicle acceleration, engine speed and engine load with predetermined reference levels.

Preferably, the method further comprises the step of estimating said total current power for said vehicle during a period in which said vehicle travelling at a substantially constant speed. Preferably, the step of estimating said total current power comprises use of an engine load parameter provided by said On Board Diagnostic system. Preferably, the method further comprises the step of adjusting said total current power by allowing for transmission losses. Preferably, the step of adjusting said total current power to allow for transmission losses comprises the step of subtraction and/or multiplication of said total current power by one or more empirical power factors. Preferably, the method further comprises the step of finding a moving or weighted average for said total current power over a plurality of periods of substantially constant speed.

Preferably, the method further comprises the step of estimating said aerodynamic resistance power by estimating rolling resistance power and subtracting said rolling resistance power from said total current power.

Preferably, the step of estimating rolling resistance comprises using estimates of said vehicle's mass, said coefficient of drag and said vehicle speed. Preferably, the step of estimating rolling resistance further comprises making allowance in said estimation of rolling resistance for a gradient on which said vehicle may be travelling.

Preferably, the method further comprises a method for determining the fuel type of a vehicle, comprising obtaining the output parameters of an On Board Diagnostic (OBD) system of the vehicle, and using said output parameters to determine the fuel type used by the vehicle.

Preferably, the method comprises identifying whether the engine is being throttled, or measuring whether the exhaust gases are in the range typical of a diesel engine or a petrol engine, or checking the fuel pressure, or using a plurality of fuel type identifying methods and further comprising assigning a weighting to the output of each of the plurality of fuel type identifying methods, said weighting varying according to the type of fuel identifying method and summing the weightings and compare the sum of the weightings to a predetermined threshold, to decide the fuel type of the vehicle.

Preferably, the method comprises the step of identifying whether the engine is being throttled comprises comparing the Manifold Absolute Pressure (MAP) with a threshold and/or comparing the air flow with a predetermined proportion of the engine capacity.

Preferably, the method comprises the step of checking whether the exhaust gases are in the range typical of a diesel engine or a petrol engine and/or checking the OBD protocol and/or checking the fuel status parameter identifier of an OBD system.

Preferably, the method comprises the step of allowing a manual override of the results of the automatic detection of fuel type.

Preferably, the method further comprises a method of estimating the mass of a vehicle; said vehicle having motion parameters comprising a vehicle speed parameter, a vehicle acceleration parameter and a maximum acceleration parameter, said vehicle having an engine, said engine having an engine capacity parameter and engine activity parameters comprising an engine speed parameter, a power parameter, a maximum power parameter and an engine load parameter, said method comprising the step of determining a weighted or moving average value of vehicle acceleration parameters taken during qualifying periods wherein at least one of the motion parameters and/or at least one of the engine activity parameters are within a predetermined range and using said weighted or moving average value of vehicle acceleration to estimate the mass of the vehicle.

Preferably, the value of at least one of said at least one motion parameters or engine activity parameters is obtained from at least one output parameter of an on board diagnostic system.

Preferably, the method further comprises the step of identifying near peak acceleration periods in which at least one of the at least one motion parameters or engine activity parameters indicates that the said vehicle is accelerating at near to its maximum acceleration.

Preferably, said at least one output parameter is one of the engine load, engine speed, vehicle speed and vehicle acceleration.

Preferably, the method further comprises the step of comparing said vehicle acceleration with at least one predetermined acceleration threshold and/or comparing said vehicle speed with a first predetermined vehicle speed threshold and/or comparing said vehicle speed with a second predetermined vehicle speed threshold and/comparing said engine load with at least one predetermined engine load threshold and/or comparing said engine speed with at least one predetermined engine speed threshold.

Preferably, each of the at least one predetermined thresholds is assigned a value according to the type of vehicle.

Preferably, said weighted or moving averaging is performed only if at least one of said motion parameters or engine activity parameters is within a predetermined range or only if a plurality of said motion parameters or engine activity parameters is within a predetermined range set for the said parameter or only if all of said motion parameters or engine activity parameters is within a predetermined range set for said parameter.

Preferably, the method further comprises determining a force provided to a crank of the vehicle during qualifying periods. Preferably, the method further comprises the step of estimating said mass of said vehicle by dividing said force by said weighted or moving average acceleration value.

Preferably, the method further comprises the step of checking whether at least one qualifying period has occurred.

Preferably, the method further comprises the step of estimating a value of said force provided to said crank using said engine size and empirically determined constants. Preferably, said value of said force is used in the calculation of mass if no qualifying period has occurred.

Preferably, the method further comprises the steps of obtaining or estimating an air flow through said engine; calculating a provisional fuel mass estimate by dividing the obtained or estimated air flow by a stoichiometric ratio associated with the fuel type; estimating the fuel consumption by dividing said provisional fuel mass estimate by an oxygen content parameter derived from an analysis of exhaust gases. Preferably, the method comprises measuring a mass air flow and/or estimating said air flow using the ideal gas equation, using estimates of pressure, volume flow rate and temperature.

Preferably, the method comprises estimating said pressure using a Manifold Absolute pressure sensor and/or using a Manifold Air temperature sensor.

Preferably, the method comprises calculating said estimate of said volume flow rate using an engine size and an engine speed.

Preferably, the method comprises obtaining said oxygen content parameter from an exhaust oxygen sensor or from a look-up table, said table providing oxygen content values according to engine speed and vehicle type.

Preferably, the method further comprises estimating an overall power of said vehicle by estimating a rolling power component, an aerodynamic resistance component and an acceleration component, using at least one parameter obtained from an on board diagnostic system of the vehicle; determining the type of fuel; and estimating said fuel consumption by summing said components of said overall power and dividing by the energy value of said fuel type and by a predetermined engine efficiency value.

Preferably, the method further comprises estimating an upper limit and lower limit for vehicle mass. Preferably, the method further comprises estimating an upper limit and a lower limit for fuel consumption, based on said upper limit of mass and said lower limit of mass respectively.

According to a second aspect, the present invention comprises apparatus for estimating the fuel consumption of a vehicle, said apparatus comprising estimating means for estimating and providing a parameter relating to overall power of the vehicle estimating means for estimating and providing a parameter relating to a rolling power component, estimating means for estimating and providing a parameter relating an aerodynamic resistance component and estimating means for estimating and providing a parameter relating to acceleration component, said overall power estimating means being adapted to be connected to an on board diagnostic system of the vehicle to receive and use at least one parameter obtained therefrom; means to provide a parameter indicating the type of fuel used; and means connected to receive the parameters relating to the estimated rolling power component, the estimated aerodynamic resistance component and the estimated acceleration component and to estimate said fuel consumption by summing said components of said overall power and dividing by the energy value of said fuel type and by a predetermined engine efficiency value.

Preferably, the means for estimating the rolling power component uses an estimated value of mass of the vehicle.

Preferably, the means for estimating the aerodynamic resistance uses an estimated value of the frontal area of the vehicle.

Preferably, means for estimating said vehicle mass or said frontal area is adapted to identify qualifying periods in which at least one motion parameter is within a predetermined range of values associated with that parameter.

Preferably, means for estimating said vehicle mass is adapted to determine a weighted or moving average value of vehicle acceleration readings taken during qualifying periods.

Preferably, the method further comprises to determine one of said motion parameters for identifying said qualifying period for estimating vehicle mass and wherein said parameter consists of said vehicle acceleration.

Preferably, the apparatus is adapted to identify a qualifying period in which said vehicle acceleration is above a predetermined threshold, said threshold being chosen to identify near peak acceleration. Preferably, means for estimating said frontal area is adapted to determine a weighted or moving average value of overall power readings taken during qualifying periods.

Preferably, the apparatus is adapted to receive one of said motion parameters for identifying said qualifying period for estimating frontal area and where said parameter consists of said vehicle acceleration.

Preferably the apparatus is adapted to identify a qualifying period in which said vehicle acceleration is between predetermined thresholds, said thresholds being chosen to identify periods of near steady state motion.

Preferably, the apparatus further comprises means for identifying an engine load reporting strategy for said vehicle, using at least one OBD parameter.

Preferably, said means for identifying said engine load reporting strategy is adapted to obtain said engine load and said engine speed and to further compare said engine load with an engine load threshold associated with said engine speed.

Preferably, the apparatus is adapted to estimate a force provided to said crank using an empirically derived relationship between force and engine size.

Preferably, the apparatus further comprises apparatus for discovering which of a plurality of possible engine load reporting strategies is used by an On-board Diagnostics system in a vehicle with an engine, comprising examining means to examine On-board Diagnostics system parameters, and means to determine the engine load when the engine is operating in such a manner as to substantially maximise the difference between the engine load values which would be produced by the different engine load reporting strategies.

Preferably, the apparatus further comprises identifying means to identify periods in which said engine is idling as to substantially maximise the difference between the engine load values which would be produced by the different engine load reporting strategies.

Preferably, said identifying means identifies periods in which said engine is idling by using said On-board Diagnostics system parameters and/or by comparing said engine speed with an idling speed threshold.

Preferably, the apparatus further comprises means to adjust said idling threshold speed to allow for a time for which said engine has been running.

Preferably, the apparatus is adapted to adjust said idling threshold speed to allow for an engine temperature and/or to allow for an engine capacity and/or to allow for a fuel type of said engine and/or to allow for an engine capacity.

Preferably, the apparatus further comprises a clutch checking means to discover whether said vehicle is being held in a stationary state by means of engaging a clutch plate.

Preferably, said clutch checking means compares a reported engine load with an engine load threshold. Preferably, the apparatus further comprises engine checking means to check that said engine is running.

Preferably, the apparatus further comprises persistency check means to perform a persistency check on said discovered reporting strategy.

Preferably, the apparatus further comprises a latch circuit to store an indicator as to said discovered reporting strategy.

Preferably, the apparatus further comprises speed checking means wherein a speed of said vehicle is used in discovering said reporting strategy.

Preferably, said speed of said vehicle is used to identify periods in which said vehicle is idling.

Preferably, the apparatus further comprises apparatus for estimating an effective frontal area or aerodynamic resistance of a vehicle including an engine comprising; apparatus for determining the total power of the engine at a substantially constant speed of the vehicle and apparatus for determining the rolling resistance power to overcome the rolling resistance of the vehicle at that substantially constant speed; apparatus for subtracting the determined rolling resistance power from the determined total current power to determine the aerodynamic resistance of the vehicle or the effective frontal area.

Preferably, the apparatus further comprises identifying means adapted to identify periods in which said vehicle is travelling at a substantially constant speed. Preferably, said identifying means is adapted to identify periods of substantially constant speed using on board diagnostic system output and/or using one or more of said vehicle speed, said vehicle acceleration, said engine speed and said engine load.

Preferably, the apparatus further comprises estimating means adapted to provide an estimate of said total current power for said vehicle during a period of travelling at a substantially constant speed and/or by using an engine load parameter provided by said OBD system.

Preferably, said adjusting means is adapted to adjust current power to allow for transmission losses by subtraction and/or multiplication of said total current power by one or more empirical power factors. Preferably, the apparatus further comprises averaging means adapted to find a moving or weighted average for said total current power over a plurality of periods of substantially constant speed.

Preferably, said identifying means is adapted to identify periods of substantially constant speed by comparing one or more of vehicle speed, vehicle acceleration, engine speed and engine load with predetermined reference levels.

Preferably, the apparatus further comprises aerodynamic resistance estimating means to estimate said aerodynamic resistance power by estimating rolling resistance power and subtracting said rolling resistance power from the total current power.

Preferably, said rolling resistance estimating means estimates said rolling resistance by using estimates of said vehicle's mass, said coefficient of drag and said vehicle speed.

Preferably, said rolling resistance estimating means makes allowance in said calculation of rolling resistance for a gradient on which said vehicle may be travelling.

Preferably, the apparatus further comprises apparatus for determining the fuel type of a vehicle, comprising means to obtain the output parameters of an On Board Diagnostic (OBD) system of the vehicle, and means to use said output parameters to determine the fuel type used by the vehicle.

Preferably, the apparatus comprises a throttling identifying means to identify whether the engine is being throttled.

Preferably, the apparatus comprises pressure comparison means adapted to compare the Manifold Absolute Pressure (MAP) with a predetermined threshold and/or air flow comparison means adapted to determine whether the air flow is less than a predetermined proportion of the engine capacity and/or an exhaust gas temperature comparison means to measure whether the exhaust gases are in the range typical of a diesel engine or a petrol engine and/or a protocol checking means to check the OBD protocol and/or a fuel status checking means to check the fuel status parameter identifier of an OBD system and/or a manual override to allow a user to override the results of the automatic detection of fuel type.

Preferably, the apparatus further comprises a throttle identifying means to identify whether the engine is being throttled, or an exhaust gas temperature comparison means to measure whether the exhaust gases are in the range typical of a diesel engine or a petrol engine, or a fuel pressure checking means to check the fuel pressure, or a plurality of fuel type identifying means and further comprising weighting means to assign a weighting to the output of each of the plurality of fuel type identifying means, said weighting varying according to the type of fuel identifying means and the output of the fuel identifying, and a decision means to sum the weightings and compare the sum of the weightings to a predetermined threshold, enabling a decision as to the fuel type of the vehicle.

Preferably, the apparatus further comprises apparatus for estimating the mass of a vehicle having an engine, said apparatus comprising; means to determine motion parameters of the vehicle comprising a vehicle speed parameter, a vehicle acceleration parameter and a maximum acceleration parameter, means to determine an engine capacity parameter and engine activity parameters comprising an engine speed parameter, a power parameter, a maximum power parameter and an engine load parameter, means to determine a weighted or moving average value of vehicle acceleration parameters taken during qualifying periods wherein at least one of the motion parameters and/or at least one of the engine activity parameters are within a predetermined range and means for using said weighted or moving average value of vehicle acceleration to estimate the mass of the vehicle.

Preferably, the apparatus is adapted to obtain the value of at least one of said at least one motion parameters or engine activity parameters is obtained from at least one output parameter of an on board diagnostic system.

Preferably, the apparatus is adapted to identify near peak acceleration periods in which at least one of said at least one motion parameters or engine activity parameters indicates that the said vehicle is accelerating at near to its maximum acceleration.

Preferably, said at least one output parameter is one of the engine load, engine speed, vehicle speed and vehicle acceleration.

Preferably, the apparatus further comprises comparison means to compare said vehicle acceleration with at least one predetermined acceleration threshold. Preferably, the apparatus further comprises comparison means adapted to compare said vehicle speed with a first predetermined vehicle speed threshold.

Preferably, the apparatus further comprises comparison means to compare said vehicle speed with a second predetermined vehicle speed threshold and/or to compare said engine load with at least one predetermined engine load threshold and/or to compare said engine speed with at least one predetermined engine speed threshold. Preferably, each of said at least one predetermined thresholds is assigned a value according to the type of vehicle.

Preferably, the apparatus is adapted such that said weighted or moving averaging is performed only if at least one of said motion parameters, or engine parameters is within a predetermined range for said parameter or only if a plurality of said motion parameters or engine parameters is within a predetermined range set for the said parameter or only if all of said motion parameters is within a predetermined range set for said parameter.

Preferably, the apparatus further comprises force determining means to determine a force provided to said crank during qualifying periods.

Preferably, the apparatus further comprises estimating means to estimate said mass of said vehicle by dividing said force by said weighted or moving average acceleration value.

Preferably, the apparatus further comprises checking means to check whether at least one qualifying period has occurred.

Preferably, the apparatus further comprises estimating means to estimate a value of said force provided to said crank using said engine size and empirically determined constants.

Preferably, the apparatus is adapted to use said value of said force in the calculation of mass if no qualifying period has occurred.

Preferably, the apparatus further comprises apparatus for estimating the fuel consumption of an engine in a vehicle comprising means for obtaining or estimating an air flow through said engine; means for calculating a provisional fuel mass estimate by dividing the obtained or estimated air flow by a stoichiometric ratio associated with the fuel type; means for estimating the fuel consumption by dividing said provisional fuel mass estimate by an oxygen content parameter derived from an analysis of exhaust gases.

Preferably, said determining means further comprises measuring means using a mass air flow sensor, and estimating means to estimate said air flow using the ideal gas equation, using estimates of pressure, volume flow rate and temperature.

Preferably, the apparatus is adapted to obtain said pressure estimate using a Manifold Absolute pressure sensor and/or using a Manifold Air temperature sensor.

Preferably, the apparatus is adapted to calculate said estimate of said volume flow rate using an engine size and an engine speed.

Preferably, the apparatus is adapted to obtain said oxygen content parameter from an exhaust oxygen sensor or from a look-up table, said table providing oxygen content values according to engine speed and vehicle type.

Preferably, the apparatus further comprises estimating means to estimate an overall power of said vehicle, by estimating a rolling power component, an aerodynamic resistance component and an acceleration component, using at least one parameter obtained from an on board diagnostic system of the vehicle; determining the type of fuel; and estimating said fuel consumption by summing said components of said overall power and dividing by the energy value of said fuel type and by a predetermined engine efficiency value.

Preferably, the apparatus further comprises estimating means to estimate an upper limit and lower limit for vehicle mass.

Preferably, the apparatus further comprises estimating means to estimate an upper limit and a lower limit for fuel consumption, based on said upper limit of mass and said lower limit of mass respectively.

According to a further aspect, the present invention provides an apparatus for discovering which of a plurality of possible engine load reporting strategies is used by an On-board Diagnostics system in a vehicle with an engine, comprising examining means to examine On-board Diagnostics system parameters, and means to determine the engine load when the engine is operating in such a manner as to substantially maximise the difference between the engine load values which would be produced by the different engine load reporting strategies.

According to a further aspect, the present invention provides a method for discovering which of a plurality of possible engine load reporting strategies is used by an On-board Diagnostics system in a vehicle with an engine, comprising examining On-board Diagnostics system parameters, and determining the engine load when the engine is operating in such a manner as to substantially maximise the difference between the engine load values which would be produced by the different engine load reporting strategies.

According to a further aspect, the present invention provides a method of estimating an effective frontal area or aerodynamic resistance of a vehicle including an engine comprising; at a substantially constant speed of the vehicle determining the total power of the engine and determining the rolling resistance power to overcome the rolling resistance of the vehicle at that substantially constant speed; subtracting the determined rolling resistance power from the determined total current power to determine the aerodynamic resistance of the vehicle or the effective frontal area.

According to a further aspect, the present invention provides apparatus for estimating an effective frontal area or aerodynamic resistance of a vehicle including an engine comprising; apparatus for determining the total power of the engine at a substantially constant speed of the vehicle and apparatus for determining the rolling resistance power to overcome the rolling resistance of the vehicle at that substantially constant speed; apparatus for subtracting the determined rolling resistance power from the determined total current power to determine the aerodynamic resistance of the vehicle or the effective frontal area.

According to a further aspect, the present invention provides an apparatus for determining the fuel type of a vehicle, comprising means to obtain the output parameters of an On Board Diagnostic (OBD) system of the vehicle, and means to use said output parameters to determine the fuel type used by the vehicle.

Preferably, the apparatus comprises a throttle identifying means to identify whether the engine is being throttled, or an exhaust gas temperature comparison means to measure whether the exhaust gases are in the range typical of a diesel engine or a petrol engine, or a fuel pressure checking means to check the fuel pressure, or a plurality of fuel type identifying means and further comprising weighting means to assign a weighting to the output of each of the plurality of fuel type identifying means, said weighting varying according to the type of fuel identifying means and the output of the fuel identifying, and a decision means to sum the weightings and compare the sum of the weightings to a predetermined threshold, enabling a decision as to the fuel type of the vehicle.

According to a further aspect, the present invention provides a method for determining the fuel type of a vehicle, comprising obtaining the output parameters of an On Board Diagnostic (OBD) system of the vehicle, and using said output parameters to determine the fuel type used by the vehicle.

Preferably, the method comprises identifying whether the engine is being throttled, or measuring whether the exhaust gases are in the range typical of a diesel engine or a petrol engine, or checking the fuel pressure, or using a plurality of fuel type identifying methods and further assigning a weighting to the output of each of the plurality of fuel type identifying methods, according to the type of fuel identifying method and the output of the fuel identifying method, and summing the weightings and comparing the sum of the weightings to a predetermined threshold, to decide the fuel type of the vehicle.

According to a further aspect, the present invention provides a method of estimating the mass of a vehicle; said vehicle having motion parameters comprising a vehicle speed parameter, a vehicle acceleration parameter and a maximum acceleration parameter, said vehicle having an engine, said engine having an engine capacity parameter and engine activity parameters comprising an engine speed parameter, a power parameter, a maximum power parameter and an engine load parameter, said method comprising the step of determining a weighted or moving average value of vehicle acceleration parameters taken during qualifying periods wherein at least one of the motion parameters and/or at least one of the engine activity parameters are within a predetermined range and using said weighted or moving average value of vehicle acceleration to estimate the mass of the vehicle.

According to a further aspect, the present invention provides apparatus for estimating the mass of a vehicle having an engine, said apparatus comprising; means to determine motion parameters of the vehicle comprising a vehicle speed parameter, a vehicle acceleration parameter and a maximum acceleration parameter, means to determine an engine capacity parameter and engine activity parameters comprising an engine speed parameter, a power parameter, a maximum power parameter and an engine load parameter, means to determine a weighted or moving average value of vehicle acceleration parameters taken during qualifying periods wherein at least one of the motion parameters and/or at least one of the engine activity parameters are within a predetermined range and means for using said weighted or moving average value of vehicle acceleration to estimate the mass of the vehicle.

According to a further aspect, the present invention provides a method of estimating the fuel consumption of an engine in a vehicle, said method comprising the steps of obtaining or estimating an air flow through said engine; calculating a provisional fuel mass estimate by dividing the obtained or estimated air flow by a stoichiometric ratio associated with the fuel type; estimating the fuel consumption by dividing said provisional fuel mass estimate by an oxygen content parameter derived from an analysis of exhaust gases.

According to a further aspect, the present invention provides apparatus for estimating the fuel consumption of an engine in a vehicle comprising means for obtaining or estimating an air flow through said engine; means for calculating a provisional fuel mass estimate by dividing the obtained or estimated air flow by a stoichiometric ratio associated with the fuel type; means for estimating the fuel consumption by dividing said provisional fuel mass estimate by an oxygen content parameter derived from an analysis of exhaust gases.

According to a further aspect, the present invention provides a method of estimating the fuel consumption of a vehicle comprising collecting data sets each of which relate to a particular different parameter and selectively processing selected data to establish the fuel consumption only if the value of some of the selected data or other data is of a qualifying value.

Said qualifying value is preferably between predetermined limits and is a substantially set value or is zero or substantially zero.

Preferably, the method includes determining an engine load reporting strategy of an on board diagnostic system of the vehicle by processing data collected when the vehicle is idling.

Preferably, the method includes determining the type of fuel used by the vehicle by processing data to provide the power of an engine of the vehicle which has been or is being collected when the vehicle is travelling at a substantially constant speed.

Preferably, the method includes determining the peak acceleration of the vehicle by processing data collected when the speed is less than a substantially set value.

According to a further aspect, the present invention provides apparatus for estimating the fuel consumption of a vehicle comprising means adapted to collect data sets, each of which relate to a particular different parameter and means adapted to selectively process selected data to establish the fuel consumption only if the value of some of the selected data or other data is of a qualifying value.

Preferably, said qualifying value is between predetermined limits and is a substantially set value or is zero or substantially zero.

Preferably, the apparatus includes means adapted to determine an engine load reporting strategy of an on board diagnostic system of the vehicle by processing data collected when the vehicle is idling.

Preferably, the apparatus includes means adapted to determine the type of fuel used by the vehicle by processing data to provide the power of an engine of the vehicle which has been or is being collected when the vehicle is travelling at a substantially constant speed.

Preferably, the apparatus includes means adapted to determine the peak acceleration of the vehicle by processing data collected when the speed is less than a substantially set value.

BRIEF DESCRIPTION OF THE DRAWINGS

Preferred aspects of the invention will now be described, by way of example only, with reference to the accompanying drawings in which.

DESCRIPTION OF PREFERRED
EMBODIMENTS OF THE INVENTION

Figure 1:
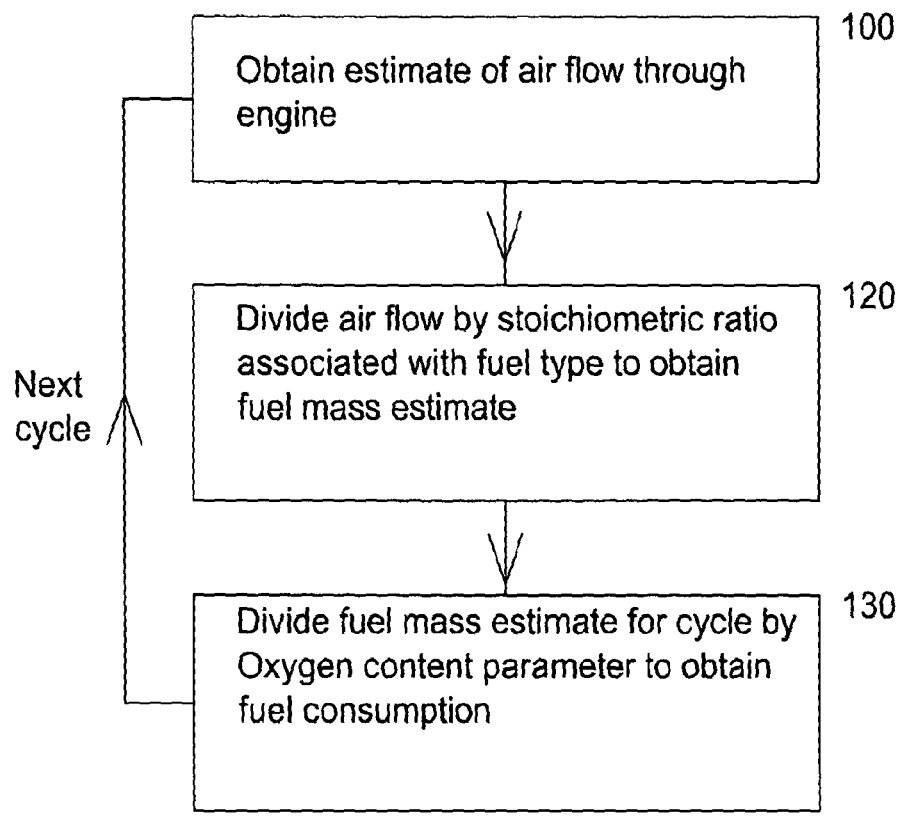
FIG. 1 illustrates the steps of a first process relating to estimation of fuel consumption.

In accordance with one embodiment and set out in FIG. 1, a method of estimating a fuel consumption provides for dynamically estimating a fuel consumption during a particular time interval of a journey, and for successive time intervals.

One way of calculating or estimating fuel consumption is based on the fuel mass processed by the engine. By obtaining a value for the air flow through an engine, we can estimate first the quantity of oxygen flowing through the engine and second, by for example analysing exhaust gases, the amount of oxygen that remains unburnt. Thus we can estimate the amount of oxygen burnt. We assume the oxygen not present in the exhaust gas is burnt so consequently we can work out, once the fuel type is known, what quantity of fuel has been used. In particular, in accordance with this method, airflow through an engine may be obtained or estimated for a particular time interval, and for successive time intervals, throughout the journey. This air flow may be obtained or estimated based on data, such as manifold absolute pressure and temperature, acquired from an On Board Diagnostics System (OBD), for example, data acquired at each reporting cycle of the OBD operation, and such cycles may define the time interval covered by the fuel consumption estimate. Alternatively, air flow may be obtained from the maximum air flow sensor, if present. A provisional estimate of a fuel mass being processed by the vehicle during each time interval may then be obtained by dividing such an air flow by a known stoichiometric ratio associated with the type of fuel being consumed. In particular, a fuel consumption value may then be estimated from the fuel mass value and an oxygen value obtained from analysis of the exhaust gases. The exhaust gases contain oxygen which has passed through the engine and remains unburnt. In an embodiment of the invention, the oxygen value is taken from an oxygen sensor, such as a lambda sensor. In an alternative embodiment, the oxygen value is obtained from a look-up taken, the value being chosen on the basis of vehicle type and current engine load.

The quantities of such unburned oxygen may be used, to derive the fuel mass estimate, and estimate fuel consumption for each time interval. This provides a means to estimate, during each sample period, the fuel consumption, so that for any given journey a fuel consumption may be calculated instant-by-instant throughout the journey. Thus a dynamic value for fuel consumption at a particular cycle of the OBD, can be estimated, and in addition a dynamic value for fuel consumption throughout a journey can be calculated.

While this provides a useful method of obtaining a fuel consumption estimate, it may not always be available or suitable.

Figure 2:
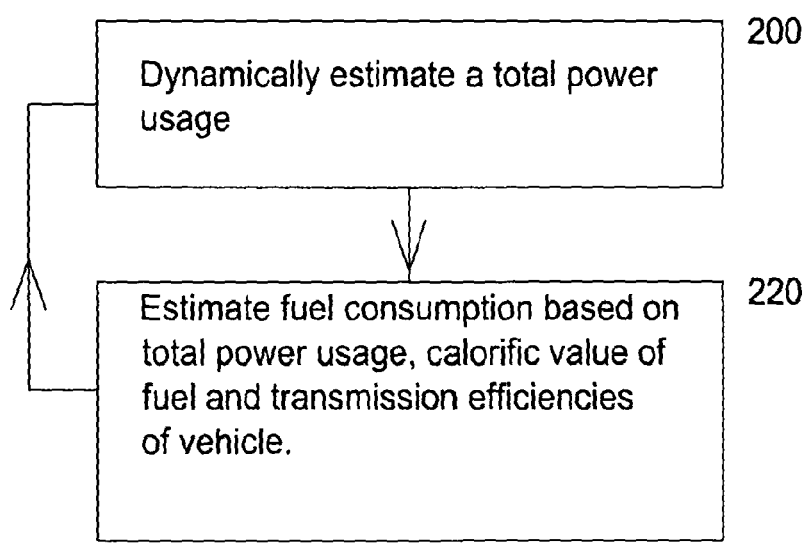
FIG. 2 illustrates the steps of an estimating fuel consumption process according to a second embodiment.

FIG. 2 sets out a further embodiment of the present invention, for use when this method is not available or suitable. In accordance with this embodiment further means may be provided to estimate fuel consumption, and these means may be available, instead of, or as a supplement to, the air flow method.

The further means provide for dynamically estimating, for each time period determined by cycles of the OBD, a total power usage of the vehicle during that time period. Fuel consumption is then estimated based on calorific values of the fuel and transmission efficiencies of the vehicle, in accordance with the following equation:

$$\text{Fuel consumption} = (\text{total power usage})/(\text{fuel calorific value} \times \text{engine efficiency}) \quad 1$$

Two of these parameters, fuel calorific value and engine efficiency, can be established conventionally.

Figure 3:
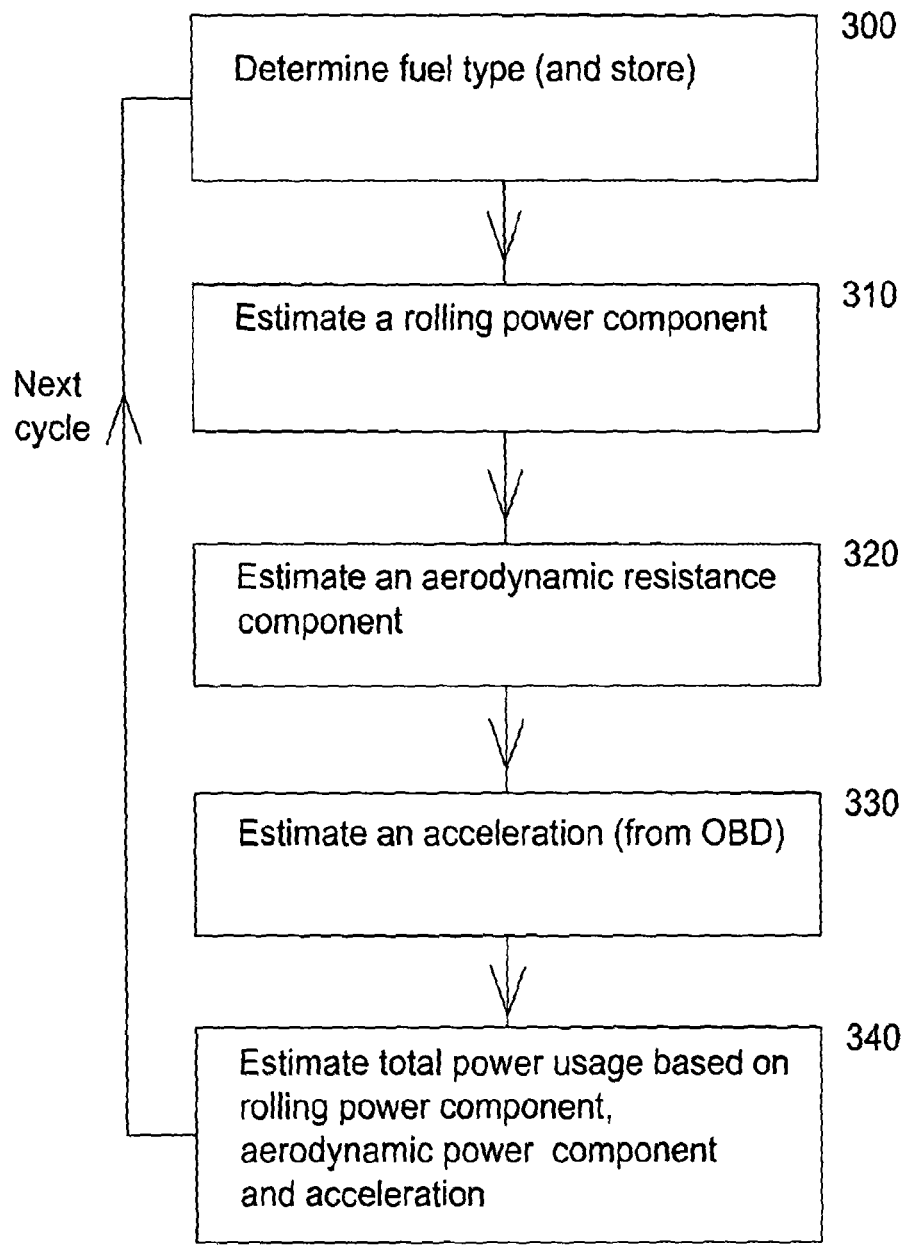
FIG. 3 illustrates the steps of estimating for estimating a total power.

The total power usage in accordance with the present invention is estimated based on several components, as shown in FIG. 3:

A rolling power component, being the power expended to overcome the friction of the road.

An aerodynamic power component, being the power expended to overcome air resistance, and.

An acceleration power component, being the power used to increase the speed of the vehicle.

These components are related by the following equation:

$$\text{total power usage} = \text{Rolling power} + \text{aerodynamic power} + \text{acceleration power}. \quad 2$$

The three components listed may be described in the following way:

The rolling power component may be summarised by:

$$\text{Rolling Power} = \text{Coefficient of Friction} \times \text{Vehicle Mass} \times 9.81 \times \text{Speed} \quad 3$$

The aerodynamic power component may be described as follows:

$$\text{Aerodynamic Power} = (0.5 \times 1.202) \times \text{Coefficient Drag} \times \text{Frontal Area} \times \text{Speed}^3 \quad 4$$

The acceleration power component may be found from:

$$\text{Acceleration Power} = \text{Acceleration} \times \text{Vehicle Mass} \times \text{Speed} \quad 5$$

In respect of the factors contributing to the rolling power component equation above it is clear that other factors will also be relevant, and for example a gradient coefficient, which is an estimate of the average gradient of the roads of a particular country or region in which the journey is made, may be used. Alternatively a gradient detector or other means may be relied upon.

Turning to the components set out in equation 3 we consider first speed. The value for speed may be provided, by the OBD or perhaps by other means.

We consider next the coefficient of friction. The coefficient of friction will be a fixed value provided to equation 3. A typical value of the coefficient of friction is 0.007, although the person skilled in the art will appreciate that different values may be used according to the road surfaces encountered and that in alternative embodiments of the invention, different values of this coefficient may be used according to conditions. For example the gradient coefficient has the purpose of making allowance for the fact that frictional force will be reduced on slopes due to the reduction in the reaction force. A typical figure for roads in the United Kingdom is 0.65, which reflects the average gradient of British roads. The person skilled in the art will appreciate that this figure may be varied according to where the vehicle is typically travelling. Other embodiments may include options for a used input value which reflects the country or region of a country or the type of roads on which the vehicle is typically used. A further embodiment would ensure that a check is made on the slope on which the vehicle is travelling before an estimate is made of the frontal area of the vehicle. An option would be for example to only record readings when a vehicle was travelling along a substantially level section of road. An alternative embodiment would provide an estimate of the current slope. The invention is not limited to any one method of estimating gradient or circumventing the effects of gradient.

We consider next a further constant, the acceleration due to gravity. This is provided to convert the vehicle mass figure into a force, in order to determine or estimate the reaction force and hence the frictional force on the vehicle. Although this is a constant, the person skilled in the art will appreciate that different levels of accuracy may be used in the recording of this factor.

This leaves the value for vehicle mass. There are many ways to arrive at a value for vehicle mass. For example a user input may be relied upon, force and acceleration readings may be relied upon and a least squares method utilised, or other conventional means.

In accordance with the present invention, the mass may be estimated by estimating the force supplied to the wheels at particular qualifying periods during vehicle use, for example, at periods of peak acceleration. This will be discussed later.

In respect of factors contributing to the aerodynamic power component, in respect of equation 4, we consider first the coefficient of drag. The coefficient of drag will be a fixed value provided to equation 4. The speed of the vehicle may be taken from the On board diagnostics (OBD) system or from a Global Positioning Satellite (GPS) system, or other means.

We consider next the remaining parameter, the frontal area of the vehicle. The frontal area of the vehicle may be a conventional user input value. In an alternative method in accordance with the present invention the frontal area, or in particular the effective frontal area, is estimated. The effective frontal area is estimated by identifying periods of steady state, i.e. non accelerating, motion, and finding an estimate for the aerodynamic power on the left hand side of equation 4, by establishing the difference between the rolling power and the total power of the vehicle. All the parameters of the equation will then be known and used to establish the frontal area, or effective frontal area, of a vehicle. This will be discussed in detail later.

In respect of the factors contributing to the acceleration power component in equation 5 above, we consider first the acceleration of the vehicle.

The acceleration of the vehicle may be acquired, for example, from the OBD or from a Global Positioning Satellite (GPS) system, or other means, and the speed and mass have already been referred to above.

Once these components have been established we can provide a value for total power usage in accordance with equation 2 above. Once a value for total power usage has been established we can estimate a value for fuel consumption.

The total power usage provided to equation 2 may be a value calculated at each time interval during the course of a journey, therefore an instantaneous fuel use may be dynamically estimated at each time interval of a journey.

Figure 4:
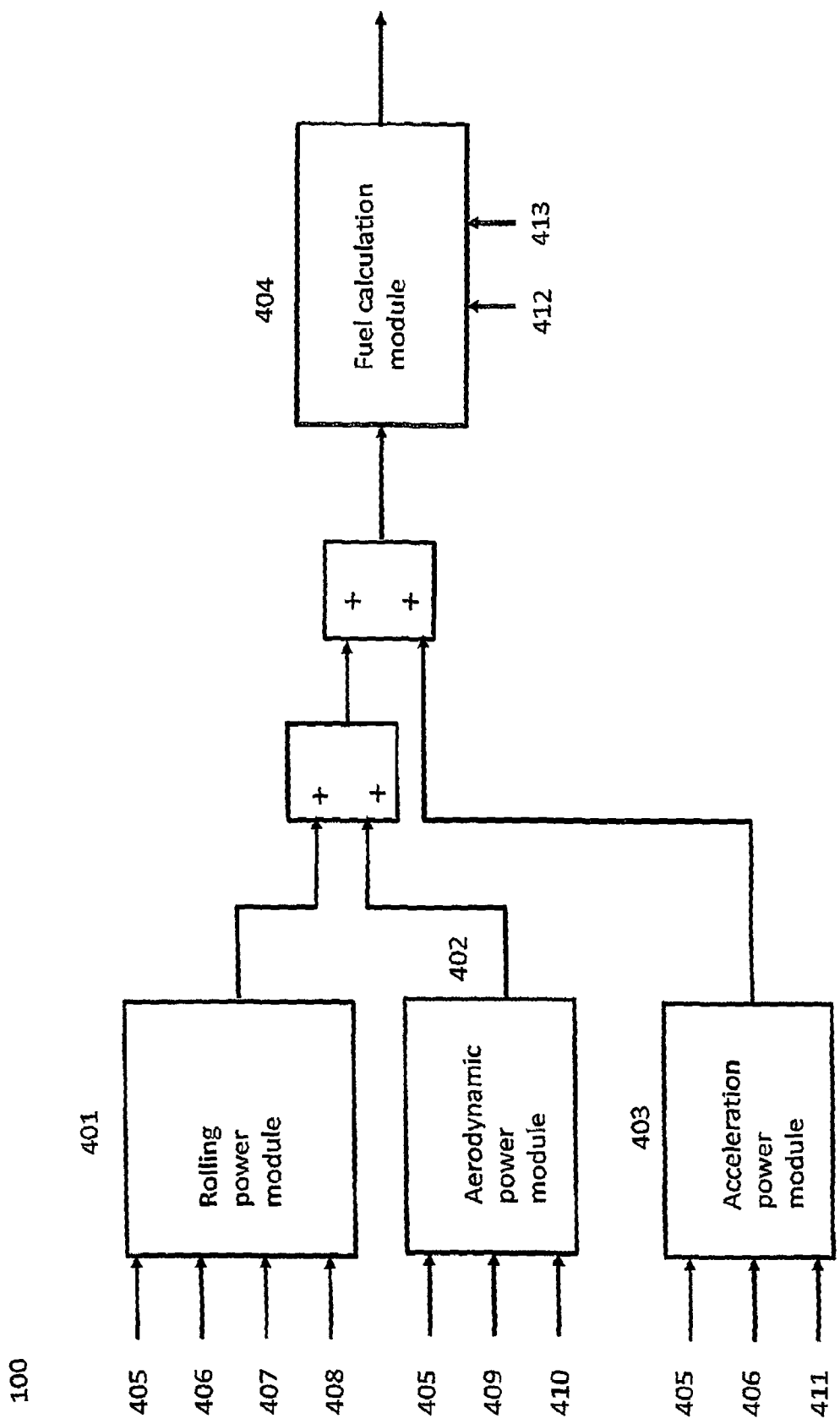
FIG. 4 illustrates an implementation of fuel consumption estimation according to an embodiment of the invention.

An example of the implementation of the above method according to an embodiment of the invention is shown in FIG. 4. FIG. 4 shows four sub-modules, the rolling power module 401, the aerodynamic power module 402, the acceleration power module 403 and the fuel calculation module 404. Nine inputs are provided, Vehicle speed 405, Vehicle mass 406, Coefficient of friction 407, Gradient coefficient 408, Coefficient of drag 409, Effective Frontal area 410, Vehicle acceleration 411, Fuel Calorific value 412 and engine efficiency 413. The outputs of the power modules 401, 402 and 403 are summed and provided to fuel calculation module 404.

Figure 5:
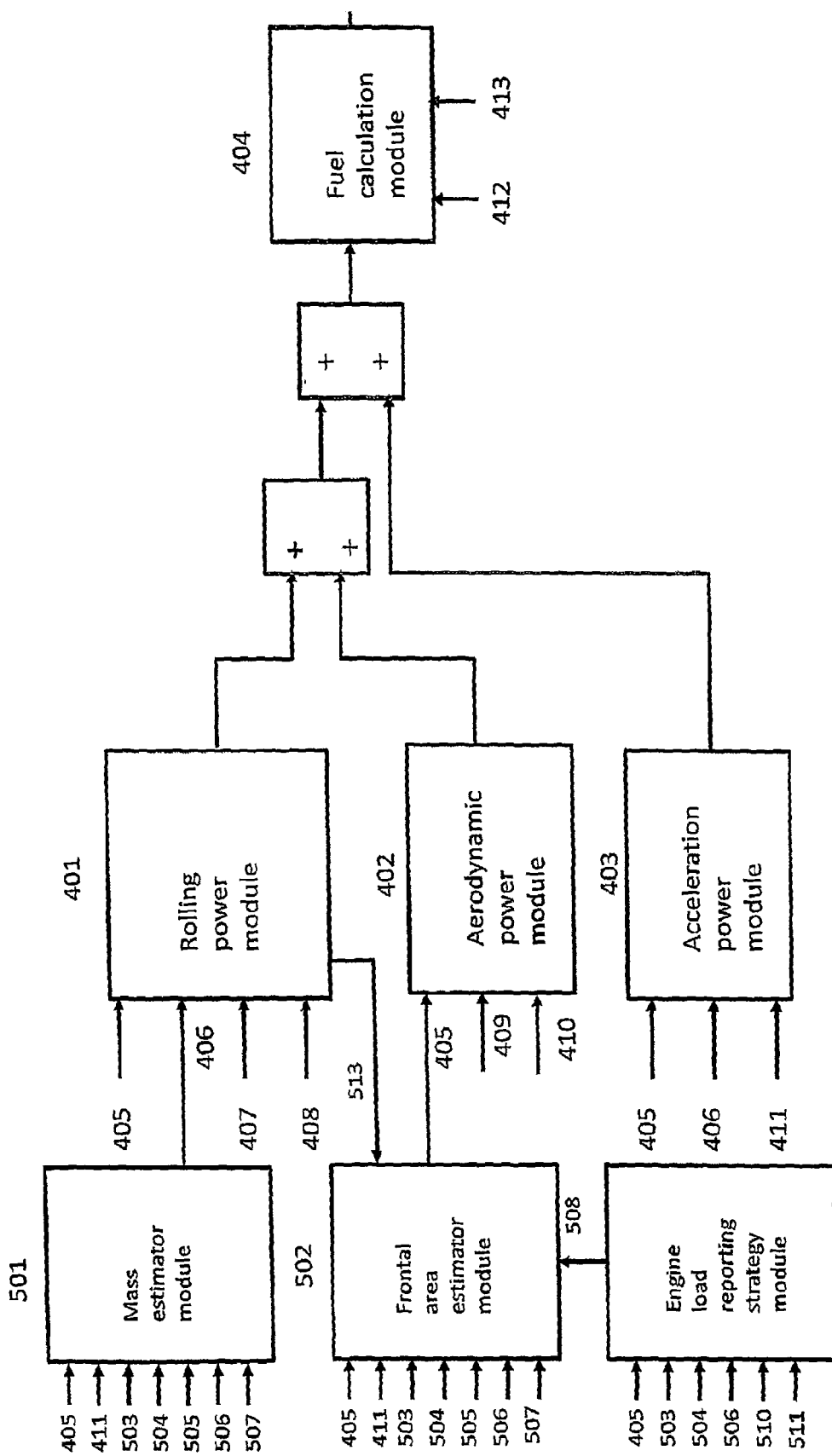
FIG. 5 illustrates an implementation of fuel consumption estimation according to an alternative embodiment of the invention.

An example of the implementation of the above method according to a further embodiment of the invention is shown in FIG. 5. This embodiment will now be discussed in detail. FIG. 5 includes Mass Estimator Module 501, Frontal Area Estimator Module 502 and Engine Load Reporting Strategy Module 503. As set out in FIG. 5, the mass estimator module provides information to the rolling power module, which reflects that the rolling power component relies on a value for mass. The frontal area estimation module and the engine load reporting strategy module provide information to the aerodynamic power module which reflects that the aerodynamic power component relies on a value for frontal area and on the engine load reporting strategy. The acceleration power component relies on a value for mass.

The frontal area estimator module 502 and the Engine Load Reporting Strategy module 503 will be discussed later.

As seen from FIG. 5, and set out herein in more detail, the mass estimator module has seven inputs: vehicle speed 405, vehicle acceleration 411, engine speed 503, engine load 504, an HGV indicator 505, fuel type indicator 506 and a maximum power 507.

The frontal area estimator has nine inputs: vehicle speed 405, vehicle acceleration 411, engine speed 503, engine load 504, an HGV indicator 505, fuel type indicator 506 and a maximum power 507, an engine load reporting indicator 508, received from module 503 and a rolling power input 513, received from module 401.

The engine load reporting strategy module has six inputs: vehicle speed 405, engine speed 503, engine load 504, fuel type indicator 506, engine coolant temperature 510 and engine on indicator 511.

Figure 6:
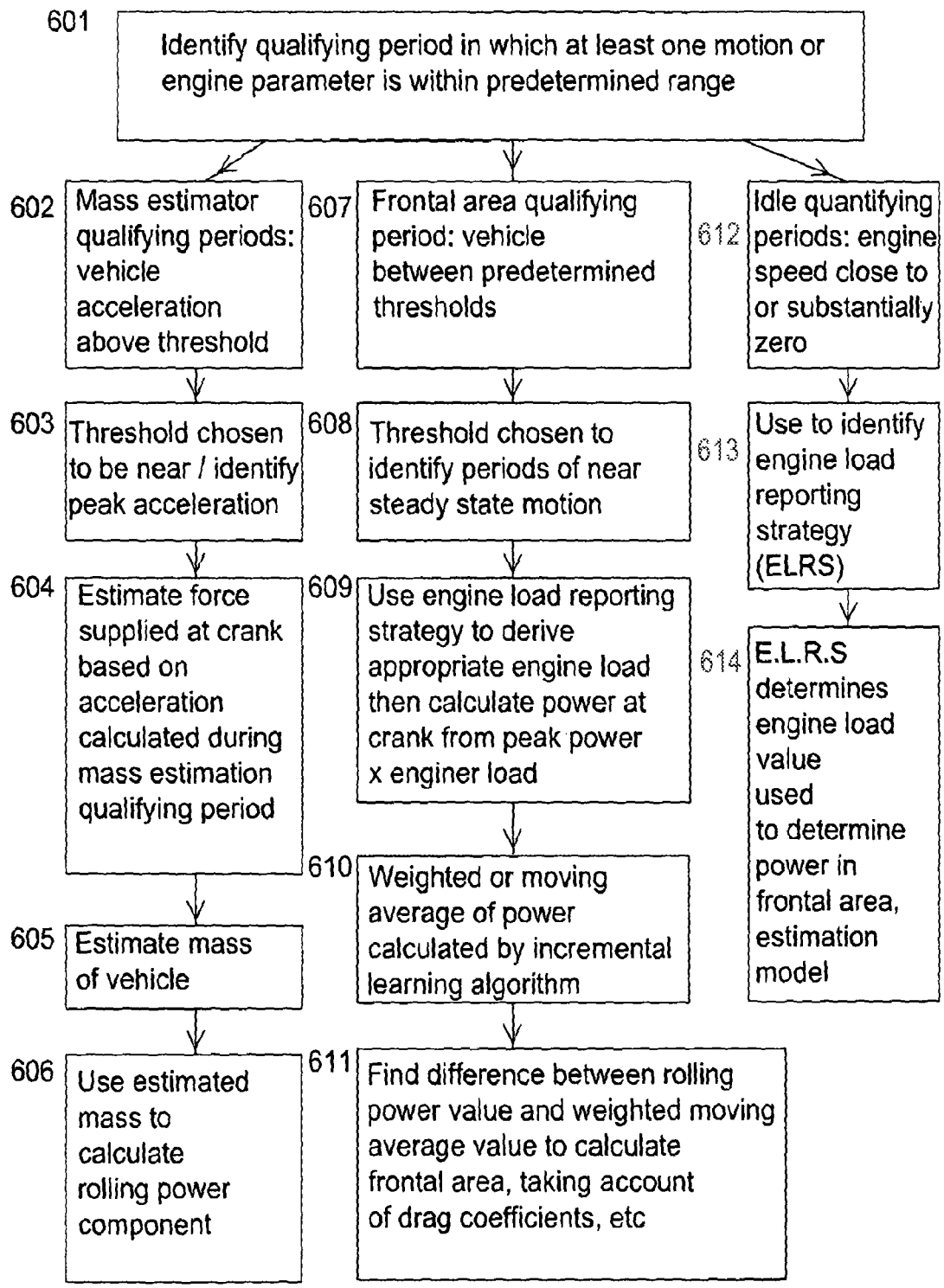
FIG. 6 illustrates the step of establishing qualifying periods according to an embodiment of the invention.

Considering first the vehicle mass: as discussed, a value for the vehicle mass is needed at least for equation 3. A mass value may be provided by estimating the force supplied to the wheels at certain times, for example during appropriate qualifying periods. In this case, the appropriate qualifying periods are periods of peak acceleration. The process of identifying qualifying periods is illustrated in FIG. 6. FIG. 6, steps 602-606 outline the process of identifying appropriate qualifying periods to estimate the mass and hence calculate the rolling resistance power component of equation 3. Periods of peak acceleration are selected as appropriate qualifying periods, in particular as it can be assumed that for such periods the engine is working at maximum power. Therefore relying on F=MA, if a known maximum value for force, and a maximum value for acceleration (peak acceleration) are used, then we should be able to derive the mass by Mass=Force (max)/Acceleration (max).

FIG. 6 shows, in step 601, that when at least one motion or engine parameter is within a predetermined range, a qualifying period may be triggered.

In the present case, when it is detected that the engine has achieved peak power, a qualifying period for the peak acceleration calculation begins.

Periods where the engine has achieved peak power may be identified using threshold values in accordance with steps 601 of FIG. 6. In particular, the thresholds are selected to determine periods of peak acceleration whilst the vehicle is in first gear. Readings of peak acceleration are taken, for example from the OBD, and an incremental learning algorithm is implemented which updates the currently held value of peak acceleration. The cases where no value for peak acceleration is held is discussed later.

As stated, estimation of the mass is performed by taking the estimated peak acceleration and a figure for the force applied.

The figure for the force applied can be obtained by conventional means from the peak power figure, by division by the vehicle velocity. The peak power figure is adjusted, using figures for transmission efficiency and transmission loss, to convert the maximum power into a figure for power at the crank.

In an alternative embodiment, empirically obtained conversion factors are used to convert the figure for acceleration into one for power/mass. The power figure is then used with this value to give an estimate for the mass of the vehicle.

While this broadly discloses this method of estimating the mass of a vehicle, there are potential problems and these are discussed below.

For example, it may be that a mass figure will be needed prior to the occurrence of a period of peak acceleration, and so an estimate of mass based on an empirically obtained relationship between engine size and vehicle mass may be incorporated into the system. A typically used empirical relationship is that 1 cc of engine size roughly correlates with 1 Kg of vehicle mass, but other values are contemplated.

In addition, a sanity check is included to ensure that the values provided are sensible and so in addition to the recognition of peak acceleration and the learning algorithm, additional optional features are available which include a comparison of the mass estimate with predetermined limits of mass, both minimum and maximum, for different types of vehicles. For example, comparison can be made with a user supplied mass figure. Alternatively, or in addition, a further value, providing a maximum and a minimum figure based on a percentage error range for the mass, may also be incorporated into the mass estimation system.

Additionally, upper and lower limits for mass, determined by the type of vehicle are also contemplated to provide for a realistic range for the mass, rather than insisting on an exact reading, and this is discussed later.

An HGV indicator may also be relied upon. The HGV indicator identifies that the vehicle is a heavy goods vehicle, which is useful both for detecting peak acceleration and also in power estimation, primarily because reference values for comparison of engine speed and vehicle acceleration, and the transmission efficiency, are set depending on whether the vehicle is an HGV.

Generally HGVs have higher efficiency values, due simply to their higher power, and so the HGV indicator is used to select between transmission efficiency values, among others. Put simply, in order to calculate peak acceleration, a mechanism for identifying peak acceleration periods is employed, in addition to a mechanism for selecting thresholds dependent on whether the vehicle is an HGV.

As discussed, a calculation of peak acceleration requires an identification as to a qualifying period, for example when near peak acceleration is occurring, and also identification as to when the qualifying period ends, when the acceleration has ended and the acceleration is dropping below the peak.

While a mass value can be derived for vehicle mass using Mass=Force (max)/Acceleration (max) this assumes that substantially all the force is directed to accelerating the vehicle. However this may not be the case, either because the force is perhaps combating air resistance (if the vehicle speed is high), or the vehicle may be going down a hill, or many more reasons.

The optimum occasion to rely on F(max)=Mass×Acceleration (max) to obtain a value for mass is when the vehicle is in first gear (i.e. at low speed) on the flat. We can rely on FIG. 6 item 601 to select threshold values for motion or engine parameters to identify appropriate qualifying periods which indicate this particular circumstance.

Such variables can include, in addition to peak power, engine load, engine speed, and vehicle speed, as set out in FIG. 5. To indicate the vehicle is in first gear on the flat, the values of each of these variables must satisfy a threshold condition. For example, an acceleration threshold, typically 0.2 ms$^{-2}$ for HGV's and 0.5 ms$^{-2}$ for other vehicles, may be provided for comparison with the actual vehicle acceleration; engine load must be greater than a given percentage of the maximum engine load, for example it may be 80% of maximum engine load; and the required levels of engine speed are generally set also and may be in the region of 1500 rpm for HGVs and 3500 for other vehicles, although all these values are exemplary only and variations are contemplated.

The vehicle speed may also be checked.

Checking the vehicle speed will assist in indicating that the vehicle is accelerating and not, for example, wheel spinning. A lower limiting speed is entered into the model prior to use, which may be the region of 20 Km/H, although other values are contemplated and fall within the scope of the invention. The lower limiting speed has the additional advantage that it helps to indicate that, for example, clutch slip is not occurring. An upper limiting speed, typically in the region of 50 KmH, but other values are contemplated, is also input before system use is initiated.

The levels, described, in combination with other values, indicate that the vehicle is in first gear and experiencing maximum acceleration, as required.

In an alternative embodiment of the invention, a GPS (Global Positioning Satellite) system is used to check that the vehicle speed corresponds correctly with the wheel speed. In yet another embodiment, an accelerometer may be used.

As stated, only periods of peak acceleration are of interest, and so it is necessary to identify the end of the qualifying period for peak acceleration.

The system may be adapted to monitor the acceleration parameters to identify the end of a period of acceleration, when an end of acceleration indication is issued.

In addition, within a given period of acceleration above the threshold, it is necessary to select the highest acceleration value achieved. According to an embodiment of the invention, this is achieved by successively comparing a currently held value of the maximum acceleration with the acceleration recorded in the current time slot.

In particular, the purpose is to provide the value of the instantaneous acceleration of the previous timeslot if the vehicle is undergoing above threshold acceleration and a zero value if its acceleration is beneath that threshold.

An important part of the invention is an incremental estimation mechanism module. This mechanism compares an instantaneous estimate of peak acceleration, with a value from the difference between a current period of peak acceleration and a previously stored value. This difference is then divided by a weighting factor and added or subtracted to the previously stored value to find a new estimated value. A weighting factor of 3 is typically used, but the person skilled in the art will appreciate that different weighting factors may be used and the current invention is by no means limited to any given weighting factor.

As part of the model, it is established that any incremental value provided for the adjustment of peak acceleration is between predetermined limits. This ensures that the incremental value will be a sensible one and will eliminate "outliers" in the increment values. Typical limiting values are based on the unladen weight of the vehicle and the maximum legal load, for example for an HGV, although it is not contemplated that these values are limiting.

The incremental estimation mechanism referenced above provides for an incremental learning algorithm which will maintain a value of peak acceleration until a new value becomes available, at which time the value is replaced.

A further potential problem relates to the procedure where no value for peak acceleration is available. In such cases it is useful to use an initial estimate of the peak acceleration. Hence a check is carried out to establish whether a peak acceleration reading has been recorded and if not, allows the use of an estimate based on engine size, and perhaps effective power, to be used prior to the recording of a peak acceleration value. A typical method of checking if an above threshold acceleration has occurred comprises checking if a peak acceleration indicator flag is set.

Alternatively, if the currently held value of peak acceleration is equal to zero, or other default value according to the constant used, this may also indicate that no period of above threshold acceleration has yet occurred.

In a preferred embodiment empirical factors may also assist in calculating such a value, for example at least one empirical power factor. Such empirical power factors may be estimated by taking experimental readings of the key parameters, namely, engine speed, engine load, vehicle speed and vehicle acceleration, and then determining a mass figure using the method described herein. This mass figure can be compared with the mass of a vehicle of known mass and the power factors estimated by a process of iteration. Typical values for the empirical power factors are 38.7 for the first power factor and 0.2885 for the second power factor. Both of these values have been obtained for diesel vehicles and are for systems in which the vehicle power is provided in Pferdstarke (PS).

Different values are required for small petrol engines, due to the lower mass of their fly wheels and other moving engine parts. The person skilled in the art will appreciate that alternative values may be used and these will be within the scope of the invention. The invention is not limited to any given values for the power factors, nor even to a given set of power value variables. For example in an alternative embodiment of the invention, a polynomial relationship may be used to give improved accuracy in the relationship between engine size, power and force.

Peak acceleration values combined with values for power, taken at constant engine velocity, may provide for an indirect calculation of force. Calculations may rely on, for example, engine power, HGV indicator and vehicle speed. In an embodiment of the invention, two values for transmission efficiency are provided, typically substantially 0.9 for heavy goods vehicles and substantially 0.85 for other types of vehicle, although these values are not limiting.

Thus methods have been disclosed for calculating a total engine power figure including a power loss figure relating to transmission efficiency. Thereafter a simple calculation may be carried out to obtain a mass estimate figure.

As discussed, in order to ensure that the mass measurements are within sensible limits, a further limitation step is provided to ensure that the mass reading provided is between reasonable limits for a given type of vehicle. This may be for example, for a heavy goods vehicle, the unladen weight of a typical HGV for the minimum value and the maximum legal load for road haulage as the maximum value. The limitation module provides an additional and optional check on the mass values.

The following example may more clearly describe the process:

Four groupings of engine size are provided, namely under 1900 cc, between 1900 cc and 4000 cc, between 4000 cc and 6500 cc and above 6500 cc. In the case of an HGV, two sets of mass data are provided, depending on whether the engine size is greater or less than 6500 cc. For each option, a minimum and a maximum value for weight is given. In the case of non-HGV vehicles, three options are provided for the maximum value, and one for the minimum value. In an embodiment of the invention, the three maximum values correspond to the maximum weights of a small car, a "4×4" and a light van respectively. The person skilled in the art will appreciate that different choices of vehicle and upper and lower limit values can be made without departing from the scope of the invention. A typical set of options for the limitation module is shown in Table 1.

TABLE 1

| HGV | Engine size | Fuel type | Minimum weight | Maximum weight |
|---|---|---|---|---|
| Yes | >6500 | | 19000 | 44000 |
| Yes | <6500 | | 3600 | 21000 |
| No | >4000 | | 3200 | 800 |
| No | >1900 | Diesel | 3750 | 800 |
| No | >1900 | Petrol | 3200 | 800 |
| No | <1900 | | 2500 | 800 |

Several steps are optionally included as part of such a limitation activity. In one step, if the vehicle seems to be an HGV, the engine size is compared with a reference value and an HGV indicator issued or confirmed. This HGV indicator is used to select a minimum mass value, for either an HGV if the indicator flag is set, or for a lighter vehicle if the indicator flag is not set. On setting the minimum mass value for an HGV, engine size is also taken into account as the engine size determines the minimum mass value of the HGV. For example, if the engine size falls within a first value, a first minimum mass value is selected, and if the engine size falls within a second value, a second minimum mass value is selected, and so on.

In addition, steps are carried out to obtain a maximum mass value. In addition to depending on engine size, the maximum mass value also depends on fuel type, and so the fuel type indicator may be relied upon in the maximum mass value calculation.

In particular a first maximum mass value may be selected if the engine size is greater than a predetermined reference value and the fuel type indicator indicates a diesel engine. This might indicate for example that the vehicle is a small van. If the engine size is greater than a further engine size reference value and the engine uses petrol, then a different maximum mass value may be selected, and so on.

Such exemplary steps are carried out to provide confidence that the mass estimation value is likely to be correct, by setting realistic minimum and maximum limits of mass.

Alternatively a user supplied vehicle mass may be used as an additional check.

Figure 7:
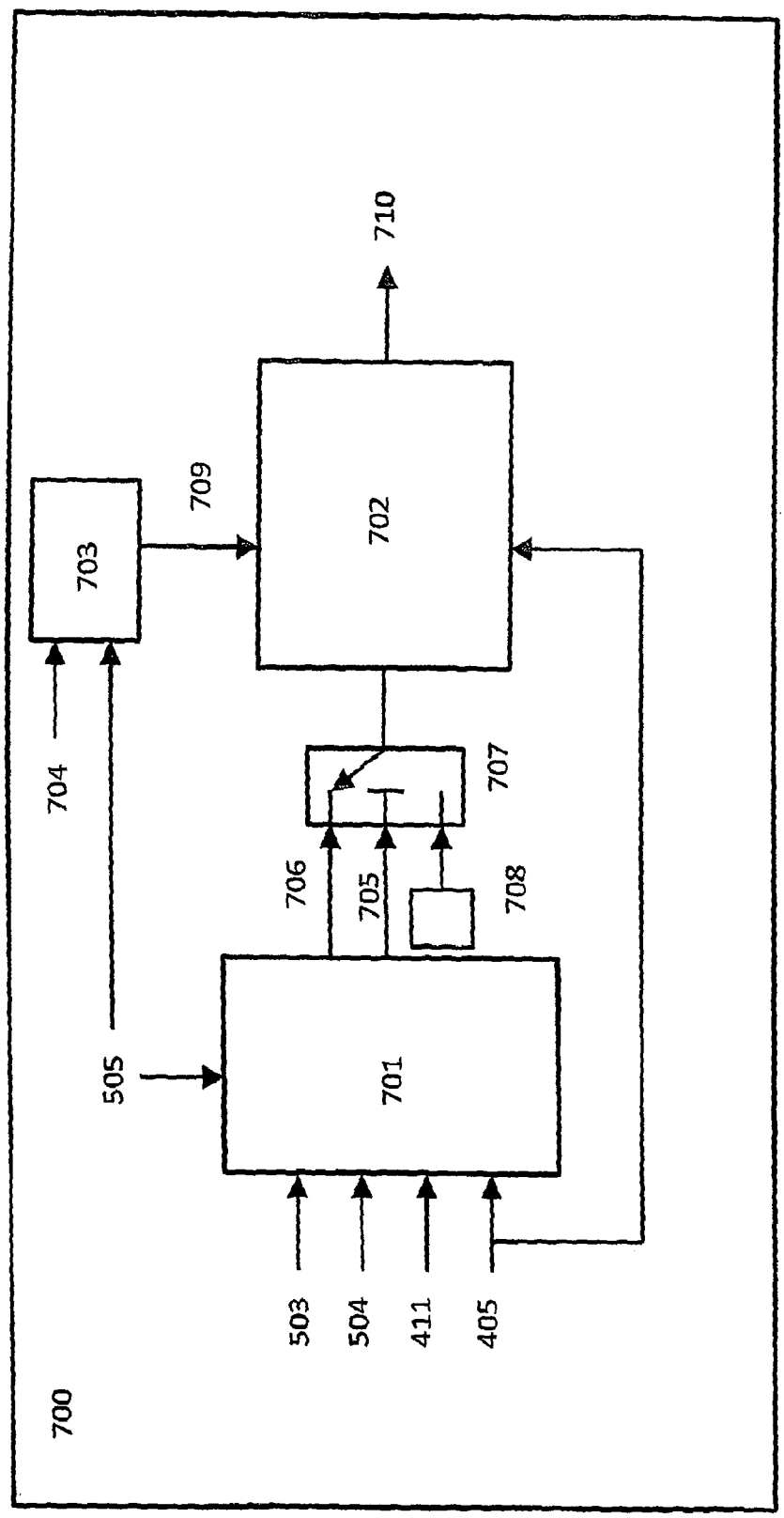
FIG. 7 illustrates a mass estimation module according to an embodiment of the invention.

Details of the mechanism of the processes discussed are set out herein. In particular, FIG. 7 shows the mass estimation module 700 according to an embodiment of the invention. It comprises a peak acceleration detection module 701, an incremental learning module 702 and a power estimation module 703. There are 6 inputs into the system, engine speed 503, engine load 504, HGV indicator 505, vehicle acceleration 411 and road speed 405. The HGV indicator 505 is used to select between reference values for comparison with the engine speed and vehicle acceleration, and the transmission efficiency, according to whether the vehicle is an HGV or other vehicle type.

The four motion and engine parameters 503, 504, 411, 405 are input into the peak acceleration module 701, which determines whether the vehicle is close to peak acceleration. The power estimation module 703 has two inputs, the HGV indicator 505 and the power input 704. The power input is the power at the crankshaft. The HGV indicator is used to make allowance for the different transmission efficiencies discussed above.

A Boolean value is output to the peak acceleration indicator 705 and the acceleration value is output at 706. If the peak acceleration indicator 705 is equal to logical one then the acceleration value is passed on by switch 707 to the incremental learning algorithm 702. If it is equal to logical zero, then the zero value from 708 is passed on.

The incremental learning algorithm has three inputs, the peak power estimate 709, the road speed 405 and an input of acceleration from the switch 707. It has a single output, the estimate of vehicle mass 710.

The estimate of mass from the model will by its nature not be exact and therefore in an embodiment of the invention, the mass reading is given within error limits rather than an exact reading. If no engine power values are known then the mass limits are the maximum and minimum values determined by the limitation process.

Figure 8:
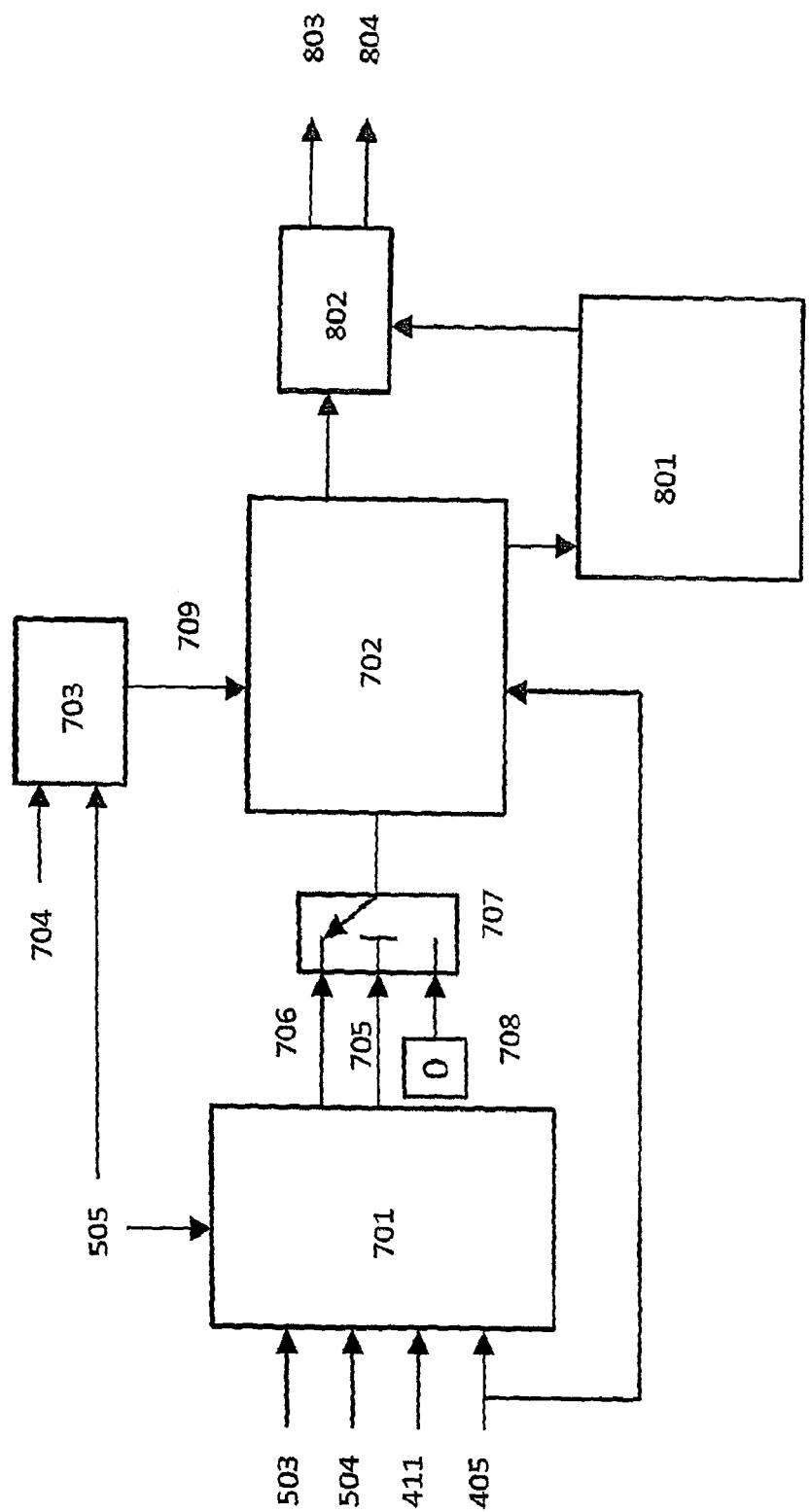
FIG. 8 illustrates a mass estimation module with limitation and limit selection modules according to an embodiment of the invention.

FIG. 8 therefore shows a second embodiment with additional modules, the limitation module 801 and the limit selection module 802. The limitation module provides for upper and lower limits of mass, determined by the type of vehicle. The limit selection module 802 gives upper and lower values of the mass estimates, thus providing a realistic range rather than an exact reading. The upper and lower limits of the mass estimate are supplied to outputs 803 and 804 respectively.

Considering now the frontal area. As shown above, Equation 4 relates to the aerodynamic power component, and relates to a coefficient of drag, a frontal area, and speed. The coefficient of drag is a predetermined value, and there are several ways to identify the speed, not least using the OBD. This leaves the frontal area. The frontal area is related to several parameters such as: vehicle speed 405, vehicle acceleration 411, engine speed 503, engine load 504, HGV indicator 505, fuel type indicator 506, maximum power 507, an engine load switch value, and a rolling power.

A value for engine load is obtained from the OBD, however to use this value effectively we need to detect an engine load reporting strategy, i.e. what the reading obtained from the OBD actually means, and this will be discussed later.

Figure 9:
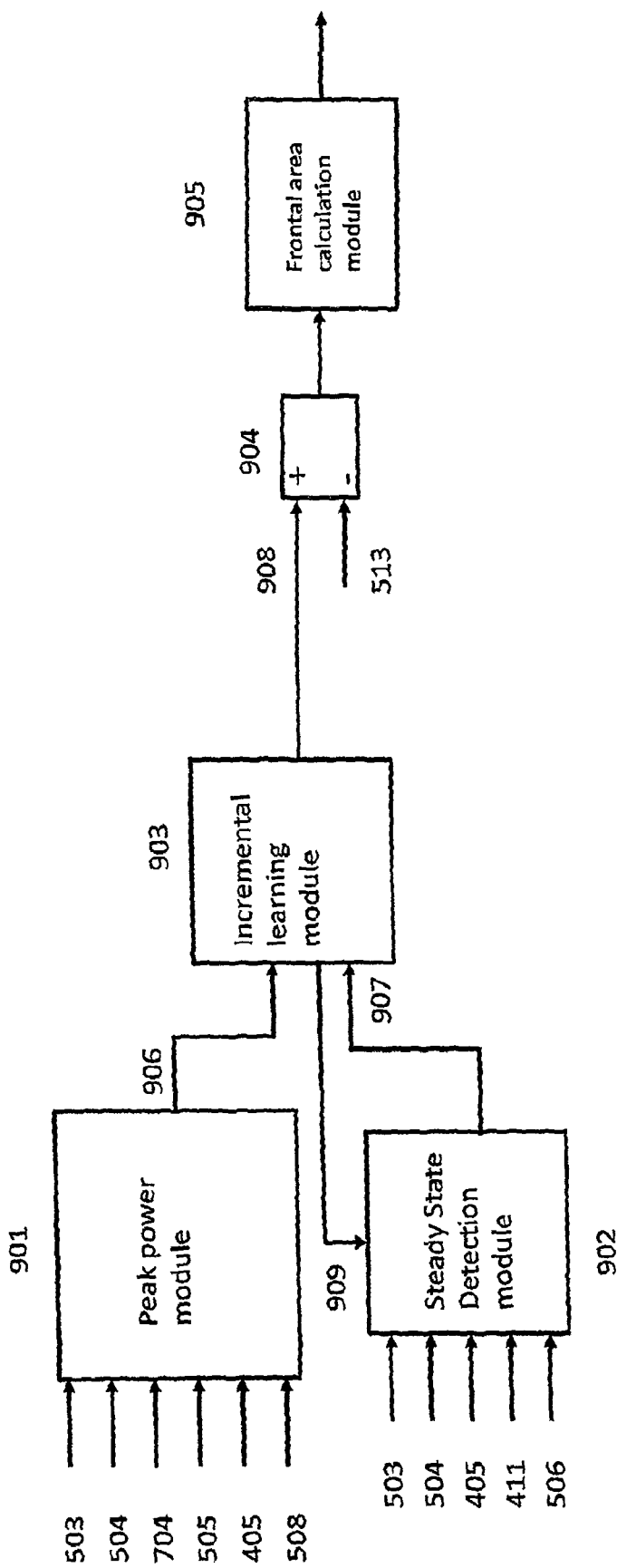
FIG. 9 illustrates a frontal area estimation module according to an embodiment of the invention.

Returning to the frontal area. FIG. 6 steps 608-611 outline the process of identifying appropriate qualifying periods for estimating the frontal area. FIG. 6 shows in step 601, that when at least one motion or engine parameter is within a predetermined range, a qualifying period may be triggered. In the present case we rely on periods of steady state, during which we calculate a figure for power supplied at the crank. This process utilises a steady state detection, with an incremental learning process as shown in FIG. 9. We measure the power at the crank at periods of steady state as we then know that the power supplied is not being provided to accelerate the vehicle, but is substantially directed to overcoming air resistance in particular a vehicle is in a steady state if it is not undergoing significant acceleration and is on a substantially flat surface. It is contemplated that a speed of, for example, around 100 Km/h, such as for example 90-110 km/h, may be used for light duty vehicles, with lower values for Heavy Goods Vehicles. In addition, a check may be carried out to determine whether the vehicle is in the correct gear. This ensures at least that energy is not being expended due to being in the wrong gear.

A current estimate of power in such a steady state is then identified. This estimate of power relies on the engine load, and this may be obtained from the OBD. This will be discussed in more detail later.

As stated in order to complete the calculation of the frontal area we need to establish the engine load 504 for the vehicle. The following sets out briefly how the engine load may be determined.

There are two major strategies by which On Board Diagnostics (OBD) systems report the engine load. Diesel engines usually report the percentage of maximum torque for a given engine speed, which gives a percentage of maximum power of the engine, whereas petrol engines, depending on vehicle type, may provide the percentage of peak power, i.e. the instantaneous power at that time. Accordingly, in an embodiment of the invention, the strategy being used by the vehicle is identified and an indicator provided to reflect the engine load reporting strategy employed, so that the engine load can be determined.

The engine load reporting strategy is discussed in detail later.

Once we have a value for the engine load we can use it to establish the frontal area. In particular, the current power supplied by the engine is estimated by multiplying the peak power by the percentage of peak power currently being used. This percentage may be obtained from the engine load value reported by the OBD. It is not necessarily clear, in any vehicle, how the engine load will be reported. For example in an OBD in which the load is reported as a percentage of maximum power, a simple multiplication of the peak power by the engine load or equivalent figure suffices. However, if the reported engine load value is a percentage of the torque at the given engine speed, then an engine load value adjustment must be made to encompass this alternative strategy.

In an embodiment of the invention, the engine load value adjustment comprises multiplying the power value by a factor equivalent to 1/(engine speed at peak power). A typical value for the engine speed at peak power is 4500 RPM, but other values are contemplated.

Depending on the way the engine load is reported, a value for the current power provided at the crank is established.

The result is then normalised to a standard vehicle speed, and the normalisation may include a fixed value for speed, or different values depending on vehicle type, or user supplied values.

Thus a figure for power, normalised for a chosen vehicle speed, typically but not limited to 100 Km/H is provided. It can also be established if the vehicle is moving in a steady state on a substantially flat surface. When it has been decided that the vehicle is in the required steady state, and a qualifying period may be in operation, in accordance with FIG. 6, initiation of the incremental learning algorithm may proceed.

Details of the qualifying period for the aerodynamic power estimation will be discussed later. First we discuss the incremental learning module. The incremental learning module relies upon three components, the averaging component, weighting component and the end of steady state identifier, and on initiation required calculations may be carried out.

The averaging module calculates the average value of the input power over a set period of time. At the end of each averaging period, this calculated value is sent to the weighting module, which calculates a weighted average between this value and the value obtained from previous averaging periods. This continues during the steady state period.

The averaging module also maintains a count of the number of samples averaged, which is reset after a set period. In an embodiment of the invention, 255 samples are taken before the rest, but the person skilled in the art will appreciate different numbers of samples may be taken and the invention is not limited to the number of samples taken in each batch. Two memories are provided for the performance of the average power input, the sample count and a sum of the power input.

At the end of a sample period all values are set to zero.

The weighting module is relatively conventional and is provided with an average power reading by the averaging process during the steady state period. In addition, a check is provided, including upper and lower limits on the weighted average value to provide confidence in the values provided.

When it is detected that the steady state condition no longer applies, the qualifying period ends, and the end of steady state identifier flag is set, which terminates the calculation.

The person skilled in the art will appreciate that there are other methods by which a suitable average value may be obtained. In another embodiment, each power value on every time slot is used for a weighted averaging, without using the suggested intermediate averaging process discussed. In yet another embodiment, a simple average is taken of all the power values obtained without any weighting process. The invention is not limited to any particular method of calculation of the average power value.

As discussed, a weighted or moving average of the power value derived is calculated by the incremental learning algorithm. Such averaging is performed over fixed size sample periods, and at the end of such a sample period, an average total power value is provided and a new sample period function is initiated.

As set out above, we can estimate a figure for the rolling power of the vehicle, estimated by a rolling power module as discussed above. A difference between the supplied rolling power of the vehicle and the current power value may be established so that a frontal area, or effective frontal area, based on the aerodynamic power and also on empirically obtained values for the drag coefficient, may be calculated, in particular from equation 4.

It is often sensible to carry out a check to provide confidence in any value calculated. This check seeks to ensure that the estimates of the aerodynamic power are within certain limits, based on the known aerodynamic drag of certain vehicles.

Returning now to qualifying periods for establishing steady state.

As stated, the purpose of the steady state detection module 902 is to identify periods in which the vehicle is being driven at a constant speed, typically within the range of 90 km/h-110 km/h, more particularly around 100 km/h, but not necessarily limited thereto. It is important that the vehicle should not be accelerating or decelerating to ensure that all power is expended to overcome the effect of the frontal area and hence establish an estimate for the frontal area. However, it would not be possible to require calculations to be performed only when the vehicle had exactly zero acceleration, so a small range, typically between −0.02 and 0.02 $MS^{-2}$ is counted as being zero acceleration, although this range is not limiting. A secondary check on steady state, to ensure that the period is, in fact, in a steady state, is to look at the engine load. The vehicle should not be coasting, nor should the throttle be wide open, and the latter combined with a near zero acceleration would indicate that the vehicle was most likely to climbing a steep hill. To provide confidence that a steady state has been detected, the engine load should therefore be within the range of substantially 30% and substantially 70% of maximum load. A further secondary check for steady state is to look at the engine speed, for example to see that the vehicle is in the correct gear. For this to be the case, the engine speed should lie between two threshold values, the lower threshold being typically higher for a petrol engine compared with a diesel engine. The engine speed will depend on whether the vehicle uses diesel or petrol fuel and typical values for the respective thresholds are substantially 4500 RPM for the upper threshold, and, for the lower threshold, substantially 2000 PM for a diesel engine and substantially 2500 for a petrol engine.

Therefore the first check as to whether the vehicle is in fact travelling at a steady state is to check that the vehicle speed is within the required range as discussed already, and the mechanism for this check is largely conventional, depending however on the vehicle speed, comparing this with reference values as discussed. It should be noted that lower values of these thresholds would be required for heavy goods vehicles due to legal limitations on their speeds. The person skilled in the art will appreciate that these reference levels are exemplary only and different levels may be used whilst being with the scope of the invention.

As stated the next check as to whether the vehicle is in fact travelling at a steady state is to check that the acceleration is within required limits, in particular that the vehicle is very close to constant speed.

The final steady state check is to establish that the engine speed is within acceptable limits, and this indicates that the vehicle is in the correct gear.

The power at the crank also takes account of at least one empirically determined power factor(s), which model the power loss or losses due to transmission. One empirical factor is subtracted from the engine power and in the preferred embodiment of the invention is the same for all vehicle types. A further power factor is a multiplicative efficiency factor, which differs according to whether the vehicle is an HGV or a light duty vehicle. The person skilled in the art will appreciate that it is possible to refine these values according to vehicle type or make, or to allow the user input of this value and the invention is not limited to any one method of allowing for transmission power losses. In the preferred embodiment therefore, the power at the crank is determined by the subtraction of a first empirical power factor and multiplication by a second empirical power factor. Selection of the second empirical power factor may be based on the type of vehicle, for example HGV or light vehicle.

There are alternative methods of providing a figure for the power at the crank, such as for example multiplication or subtraction by a single transmission factor or by direct estimation of the power at the crank. Typically the value of the first power factor is substantially 10 PS (~7.5 KW) and the values of the second power factor are substantially 0.9 for an HGV and 0.8 for a light duty vehicle. The person skilled in the art will appreciate that these values may be varied and the invention is not limited to any particular values of the power factors.

The frontal area may now be calculated, for example by reverse engineering from the aerodynamic power calculated in a steady state at around 100 Km/h. This figure may then be used for estimation of the aerodynamic resistance at different speeds and accelerations. The formula for effective area is obtained by rearranging equation 4 above and is given in equation 7:

$$\text{Area} = \frac{2 \times \text{Power}}{\rho C_d v^3} \qquad \text{Equation 7}$$

Where $\rho$ is the density of the fluid through which an object is moving, v is the velocity of the object, A is the effective area of the object and $C_d$ is the drag coefficient.

A figure for the aerodynamic resistance is obtained by subtracting the estimate of rolling resistance obtained from the Rolling Power calculation carried out above. The estimate of aerodynamic power is used in the Frontal Area Calculation together with the parameters set out above.

We now discuss the arrangement in more detail.

FIG. 9 illustrates a frontal area estimation module according to an embodiment of the invention. It comprises a power module 901, a steady state detection module 902, an incremental learning module 903, subtractor 904 and a frontal area calculation module 905. The power module provides a figure for the power at the wheels, based on values provided for engine speed 503, engine load 504, engine power 704, HGV indicator 505, vehicle speed 405 and engine load switch 508, which indicates the engine load reporting strategy.

The power at the wheels 906 is supplied by power module 901 to the incremental learning module 903, which is activated when an indicator 907 is received from the steady state detection module 902. The steady state detection module receives current values for engine speed 503, vehicle speed 405, acceleration 411, engine load 504 and fuel type 506. The current estimate of power in the steady state is supplied to input 908 of subtractor 904. The Incremental learning algorithm 903 performs a weighted or moving average of the power value obtained from the Power Module 901. At the end of such a sample period, an average total power value is forwarded by the Incremental Learning Module 903 to subtractor 904. Additionally, an end of sample period indicator 909 is sent from the Incremental Learning Module to the Steady State Detection Module in order to start a new sample period.

A rolling resistance power is supplied to input 513 and is subtracted from the output 908 of the Incremental Learning Module 903, to give an estimate of the aerodynamic power to Effective Frontal Area Calculator 905. Effective Frontal Area Calculator 905 calculates the effective frontal area based on the aerodynamic power and empirically obtained values for the drag coefficient.

Figure 10:
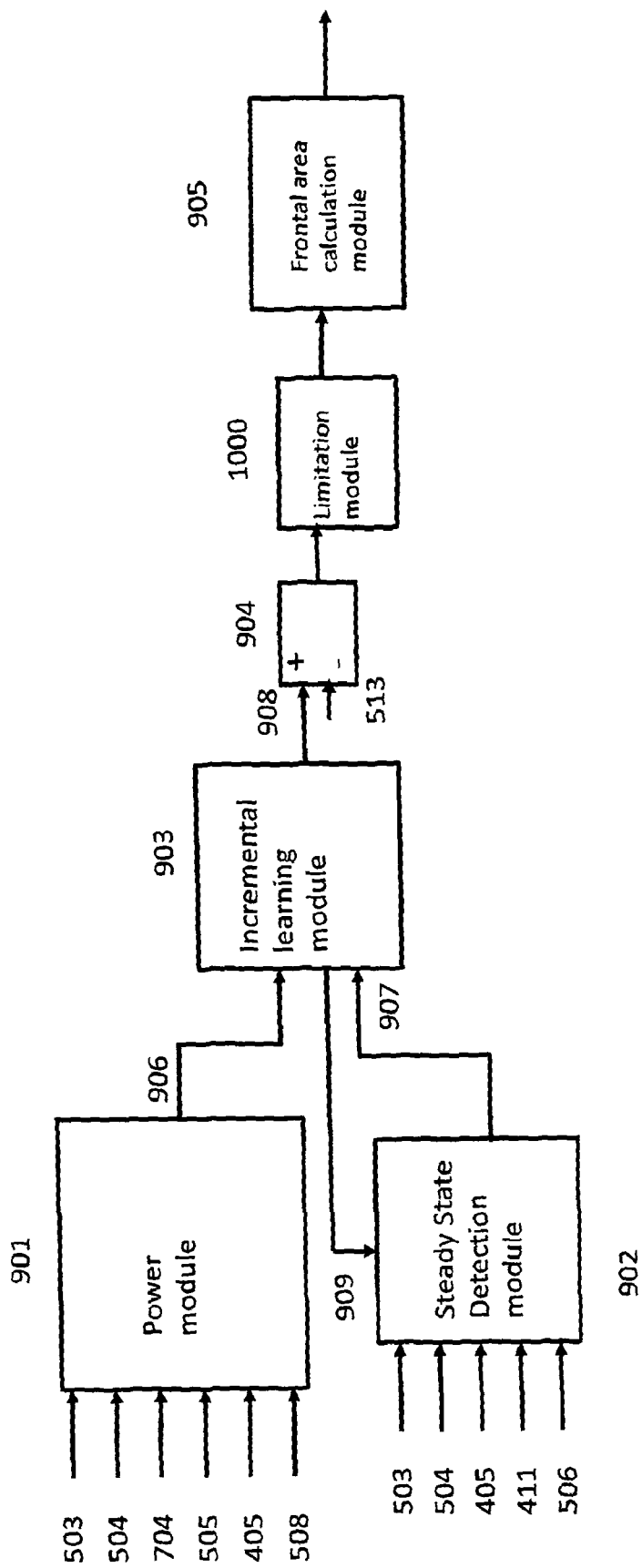
FIG. 10 illustrates a frontal area estimation module with limitation module according to an embodiment of the invention.

In a preferred embodiment of the invention, a limit is introduced for the upper and lower values of the aerodynamic power. The limits relate to values for a variety of vehicles, including large or small cars, light vehicles, or an HGV vehicle. Accordingly, FIG. 10 illustrates another embodiment, which further comprises a limitation module 1000, which ensures that the estimates of the aerodynamic power are within certain limits, based on the known aerodynamic drag of certain vehicles.

It is contemplated that intermediate values, such as area multiplied by one or more of the drag coefficient, vehicle speed cubed, fluid density or the constant 0.5, may be used and suitably converted using equation 7 or an appropriate derivative. The person skilled in the art will appreciate that any of these methods can be used without affecting the embodiment of the invention.

As set out above, critical to the estimation of the Effective Frontal Area is the engine load reporting strategy, and we will now discuss the Engine Load Reporting Strategy in detail. As explained above, the engine load may be provided as a percentage of the maximum torque or a percentage of the torque at the given engine speed. In an embodiment of the invention, the reporting strategy is entered by the user. In an alternative embodiment, it is deduced by examination of the OBD output parameters.

At high engine speed and load, the two reporting strategies will give readings which are very close to each other as the engine is working at its maximum and an engine power at the given speed is close to a maximum engine power for the vehicle. In contrast, the point of greatest contrast in reported engine load values is when the engine load is at its lowest. This latter point will occur when the engine is idling.

Therefore in a preferred embodiment, the Engine Load Reporting Strategy will be deduced by identifying periods, idling qualifying periods, in which the engine is idling and comparing the engine load with a predetermined threshold. This process is set out in FIG. 11. The process of identifying qualifying periods for determining the engine load reporting strategy are illustrated in FIG. 6, steps 612 to 614.

The idle speed (generally measured in revolutions per minute, or rpm, of the crankshaft) of an internal combustion engine is the rotational speed of the engine when it is uncoupled from the drive train and the throttle pedal is not depressed. At idle speed, the engine generates enough power to run reasonably smoothly and operate its ancillaries (water pump, alternator, and, if equipped, other accessories such as power steering), but usually not enough to perform useful work, such as moving an automobile. For a passenger-car engine, idle speed is customarily between 600 rpm and 1,000 rpm. When idling, an engine typically has a load of a few percent of maximum power, normally less than for example 8%, and the engine speed will also be low at idling, for example the percentage of the maximum power for the given engine speed will typically be around 20-30 percent.

Figure 11:
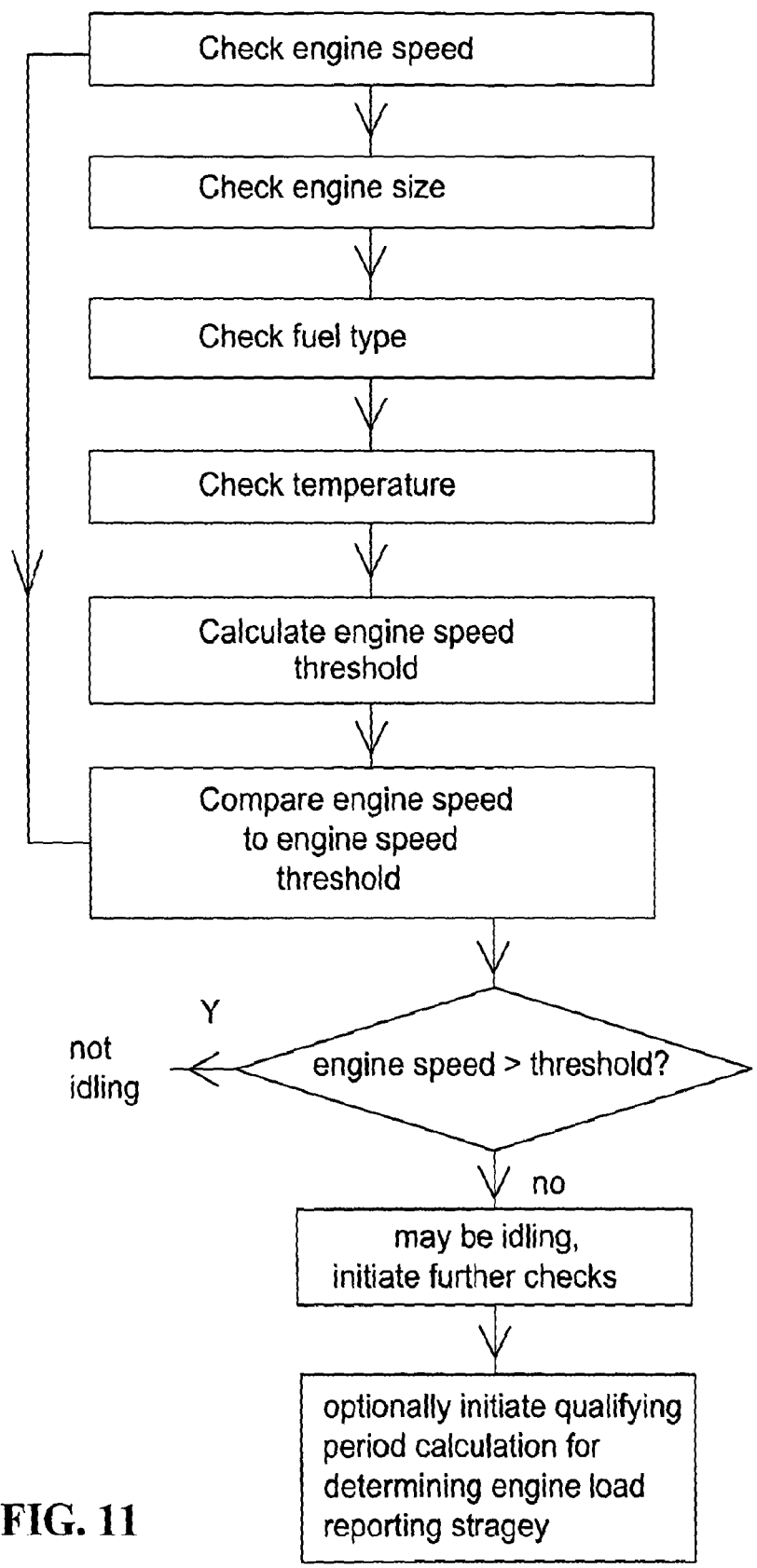
FIG. 11 illustrates the steps in determining the engine load reporting strategy according to an embodiment of the invention.

FIG. 11 shows the parameters to be considered in determining if an engine is idling. For example, periods in which the engine is idling are identified by checking the engine speed and comparing this to a threshold value, the idle speed threshold. A default value for the threshold is used as a starting point and adjustments are then made to it to allow for engine temperature (related to the length of time the engine has been running), engine size and fuel type.

We check fuel type because diesel engines usually have higher idling speeds than petrol engines. We check engine size because smaller engines have higher idling speeds than large ones. We check the temperature because, in general, the hotter the engine, the lower the idling speed will be. It may be that no correction is made for the length of time the engine has been running, or coolant temperature may not be relied upon.

We must also take into account that a minimum engine speed must also be exceeded to ensure that the engine is in fact running.

To avoid mistaking an engine idling circumstance, for example where a vehicle may be coasting downhill, or moving slowly forward with no pressure on the throttle, a further check may be carried out on vehicle speed, in which the vehicle speed is taken from the OBD system, a zero value confirming an idle condition.

In addition we also need to consider that if a vehicle is being held on the clutch on a slope, the vehicle may have zero speed but the engine may not be idling. This can be identified by comparing the engine load with a threshold dependent on fuel type. Typical values for the thresholds are 70% load for diesel engines and 23% load for petrol engines. However the invention is not limited to any particular values for these thresholds.

Once it has been established that an engine is idling, we can implement to the method of determining the engine load reporting strategy.

As discussed, if it is determined that the engine is idling and the reported engine load is less than a threshold, then the reporting strategy is likely to be a percentage of maximum torque, whereas if it is above the threshold the reporting strategy is likely to be a percentage of power at the given engine speed. An indicator as to which strategy has been detected is then passed on to a persistency check and latch function. This seeks to ensure that the strategy is only recorded as correct if the indicator has been set to the level for a given time threshold, i.e. a persistency check is carried out, and if passed the engine load reporting strategy is fixed.

As stated, the running time and temperature of the engine is also relevant and if the running time is less that a pre-set threshold (the idle time threshold), the temperature of the coolant, obtained from the OBD system, may be used to adjust the threshold.

In addition the engine load is checked against a predetermined threshold, as the engine load depends on whether the engine uses diesel or petrol, and exceeding the threshold provides a strong indication that, even if the vehicle speed is zero, the engine is not idling, but may be on a slope held on the clutch. A clutch check utilises the fuel type indicator, and engine load, to select a diesel or petrol clutch threshold, although other methods are also contemplated.

Thus, the engine load reporting strategy is calculated by determining whether the engine is idling and then determining whether the engine load is greater than a given threshold. The method also checks the engine speed to see if it is below the idle speed threshold calculated by this process, whether the engine is running, indicated by whether the engine speed is above a required threshold, whether the clutch check module has indicated that the vehicle is being held on its clutch, and the vehicle speed. If the engine is determined to be switched on, is operating at below the calculated idle speed threshold and the vehicle speed is zero, then the engine is assume to be idling.

In more detail, as stated, as an overall review, in order to determine the engine load reporting strategy, a period, the idling qualifying period, in which the engine is idling, must be identified. If during this period, the reported engine load is small, typically a single figure percentage, then the reporting strategy is taken to be to state the percentage of maximum torque. If the reported engine load is larger than this, then the reporting strategy is taken to be to state the percentage of engine load at the given engine speed. The engine is identified as idling if the vehicle speed is zero, the vehicle is not being held on the clutch and the engine speed is less than a given threshold. The threshold is determined taking into account the fuel type, the engine temperature, the engine size and the length of time for which the engine has been running, although other means are contemplated. For example, in an embodiment, a fixed threshold may be used. In a further embodiment, a threshold altered to allow for engine size only may be used. In yet a further embodiment, only adjustments for engine running time may be used, either as a threshold running time or an adjustment based on engine temperature.

Figure 12:
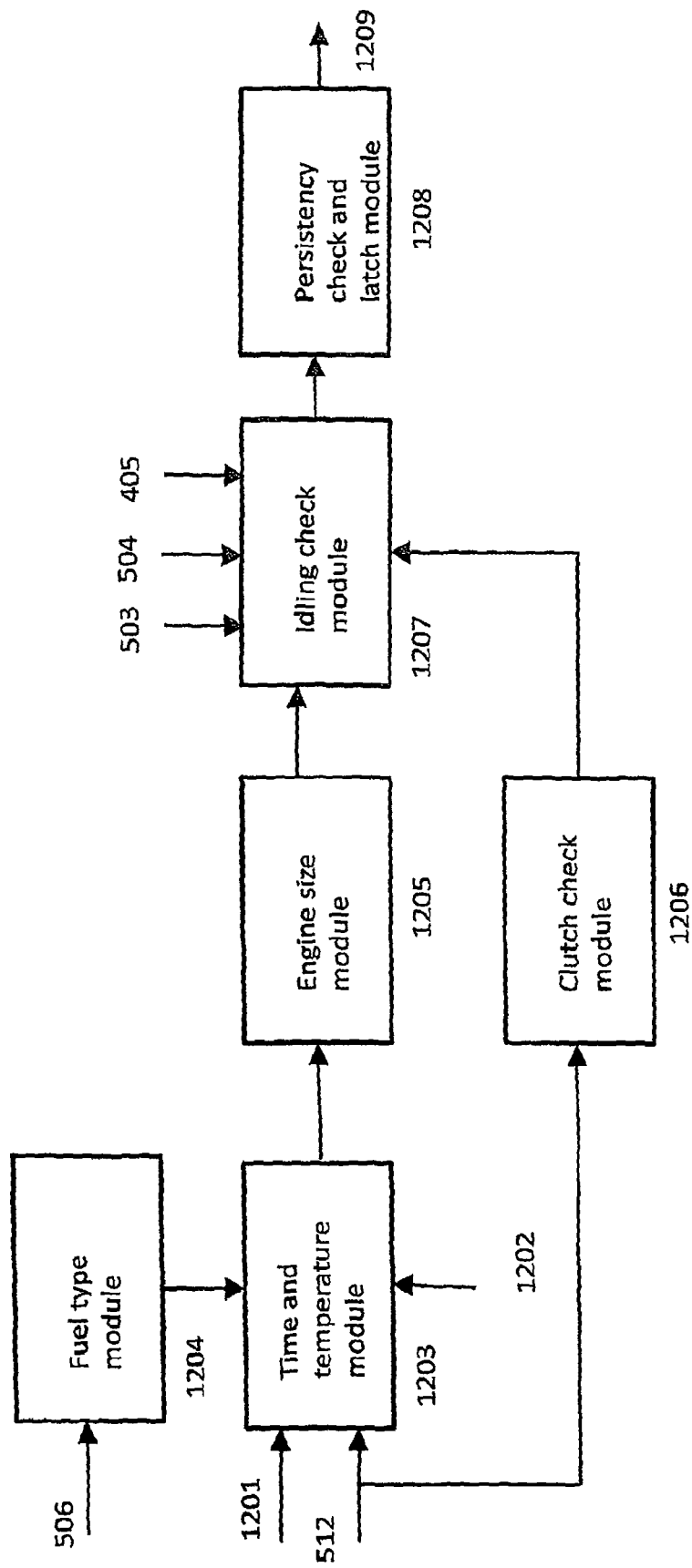
FIG. 12 illustrates an engine load reporting strategy determination module according to an embodiment of the invention.

In further detail and with reference to the drawings, the stages of the determination of the engine load reporting strategy are illustrated in FIG. 11 and an engine load reporting strategy detection module according to an embodiment of the invention is illustrated in FIG. 12. The engine load reporting strategy detection module is set out in FIG. 12, which shows six component modules including a time and temperature module 1203, a fuel type module 1204, an engine size module 1205, a clutch check module 1206, an idling check module 1207, and a persistency check and latch module 1208. These modules have seven inputs, engine on indicator 512, fuel type indicator 506, engine coolant temperature input 1201, engine speed 503, engine load 504, vehicle speed 405 and OBD sample time 1202.

Starting with the Time and temperature module 1203, this module checks whether the engine has been on for more than a threshold period of time. In an embodiment, if the engine has not been running for more than a threshold time, then the engine temperature, measured by reference to the coolant temperature 1201, is considered in the determination of whether the engine is idling. In another embodiment, no measurements are taken if the engine has not been running for at least a given length of time. In yet another embodiment, no correction is made for the length of time for which the engine has been running.

Turning now to the Fuel type module 1204, this module makes adjustments to the engine speed threshold according to fuel type.

We next consider the engine size module 1205. This module adjusts the engine speed threshold according to the engine size of the vehicle.

Turning now to the Clutch check module 1206, this module detects if the vehicle is being held on a hill on the clutch.

As part of the detection of the Engine Load Reporting Strategy, the engine load reporting strategy module 1207 (idling check) takes the values of the engine speed 503, vehicle speed 405 and engine load 504 to determine whether the engine is idling and then checks whether the engine load reported is less than a threshold. If it is less than a given threshold, it is determined that, since the engine load reported is comparatively small, the value reported must be a percentage of maximum torque. Alternatively, if the engine load reported is above the threshold, then the value reported is the percentage of power at the given engine speed. An indicator as to which strategy has been detected is then passed on to the persistency check and latch module 1208. The persistency check module ensures that the strategy is only recorded as correct if the indicator has been set to the level for a given time threshold. If this persistency check is passed, then the latch circuit ensures that a strategy indicator is continuously provided to an output 1209, even after the period of idling has ended.

The fuel type has been mentioned and referred to several times as part of this process. In particular, the fuel type, i.e. whether it is diesel or petrol, is of critical importance in the determination of thresholds used in determining qualifying periods. An example of this is the engine speed threshold used in determining the engine load reporting strategy.

According to an embodiment of the invention, there is provided a mechanism for determining whether the vehicle uses diesel or petrol. This mechanism exploits certain differences in the operation of diesel and petrol engines. Amongst these differences are the mechanism for control of the engine load, temperature differences in the exhaust gases, differences in the on board diagnostic protocols used, the reporting of fuel status and differences in fuel pressure.

In a petrol engine, load control is achieved by "throttling" the engine, which entails restricting airflow and hence reducing the available oxygen to burn. Petrol engines are almost always constrained to run at a stoichiometric fuel ratio. Diesel engines operate under normal conditions without a throttle in the intake manifold. Variation in the load on a diesel engine is achieved by careful fuel quantity delivery alone.

In some vehicles the manifold pressure is reported, which allows a straightforward check to see if the engine is throttled. If the engine is running and a significant vacuum occurs, this is indicative that the engine is a petrol engine. A typical value detected is in the region of 50 KPa below atmospheric pressure, but the person skilled in the art will recognise that other suitable values may be used and the invention is not limited to any particular threshold of manifold pressure. When the vacuum condition is observed for a significant period, then the vehicle is recognised as having a petrol engine, otherwise, it is recorded as using diesel.

In other vehicles the manifold pressure is not reported. In these cases, the air flow rate may be checked. If the air flow is less than a predetermined fraction of the engine size, this is an indication that the engine is being throttled, which, as stated, identifies the engine as running on petrol. A typical fraction of the engine size is $\frac{1}{300}^{th}$, but the person skilled in the art will appreciate that alternative values for this fraction may be used and the invention is not limited to any given predetermined fraction.

Another mechanism which may be used to identify the fuel type is exhaust gas temperature. The temperature of the exhaust gases is much higher in a petrol engine than a diesel one. This fact can be used to provide an alternative mechanism for the detection of fuel type. In an embodiment of the invention, the exhaust gas temperature is compared with at least one threshold. In further embodiments, upper and lower thresholds are used.

Another indicator of the fuel type is the protocol used by the on board diagnostics system. One such protocol is the J1939 protocol, which is used exclusively by Heavy Goods Vehicles (HGV's). HGV's are usually fuelled by diesel and therefore detection of the J1939 protocol will be indicative that the vehicle is powered by a diesel engine. In an embodiment of the invention, an OBD protocol sniffer is used to identify the protocol used. The protocol type is represented by an enumerated state and if the enumerated state corresponds with a value representing the J1939 protocol we may assume it is an HGV vehicle. However, some HGV's are fuelled by Biogas, so use of the J1939 protocol is not conclusive proof of the use of diesel fuel. Since biogas has similar exhaust gas temperatures to petrol engines, a diesel is only reported by the protocol detection system if the exhaust temperature is also that of a diesel.

A further significant difference in the operation of diesel and petrol engines is the pressure at which the fuel is supplied. This value is significantly higher in diesel engines and this fact may be used to recognise a diesel fuelled vehicle. In an embodiment of the invention, the common rail fuel pressure is compared with a predetermined threshold in order to identify a diesel engine.

In addition, petrol engines can be identified by reference to one of the standard OBD parameter identifiers (PIDs), namely PID 03, the fuel status type. A request can be made to the OBD as to the fuel status, which can be cold start, closed loop or component protection. While petrol engines use this status PID, diesels do not. Therefore, in an embodiment of the invention, a request is made to the OBD for PID 03. If there is a response, this indicates that the engine is fuelled by petrol. If the request times out, this is indicative of a diesel engine.

Various embodiments of the invention are possible, which use the above fuel type detection methods. The person skilled in the art will appreciate that any individual method or combination of methods may be used to determine the fuel type of the vehicle and the invention is not limited to any one or any one combination of methods. In an embodiment of the invention, all of the methods are used in combination. However, the different indicators are not all equally conclusive of fuel type. The fuel pressure is not completely conclusive, as there is the possibility of a high fuel pressure petrol engine. The use of the fuel status, presence of throttling and high exhaust gas temperatures are all strong indicators of a petrol engine.

Figure 13:
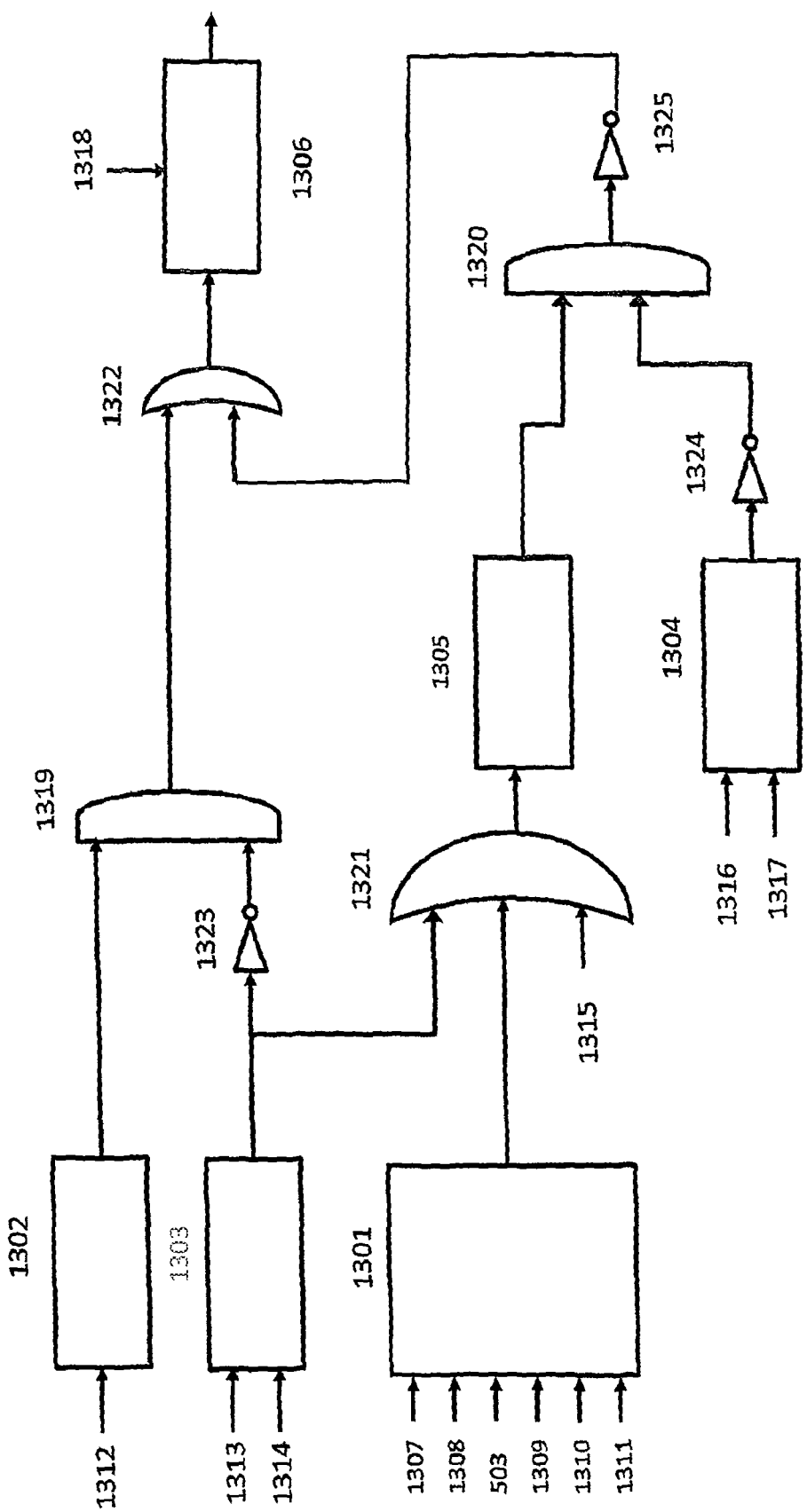
FIG. 13 illustrates a fuel type detection module according to an embodiment of the invention.

Setting out the fuel type detection mechanism in more detail we refer to FIG. 13.

FIG. 13 illustrates a fuel type detection module according to an embodiment of the invention. There is provided a Pressure And Flow Rate Module 1301, Protocol Recognition Module 1302, an Exhaust Gas Temperature Module 1303, a Fuel Pressure Module 1304, a latch circuit 1305 and a manual override 1306. The Fuel Type Detection Module is provided with six inputs; Manifold Absolute Pressure 1307, Manifold Absolute Pressure Validity Indicator 1308, Engine speed 503, Air flow rate 1309, Air flow validity indicator 1310 and Engine size 1311, the Protocol recognition module has one input, the Protocol Type Input 1312. The exhaust gas temperature module has two inputs, Exhaust Gas Temperature 1313, and Exhaust Gas Temperature Valid 1314. The fuel pressure module has two inputs, Fuel Pressure 1316, and Fuel Rail Pressure Valid 1317. The manual override module has one input: Manual Override 1318.

The Protocol recognition module 1302 takes the value of the enumerated state from the OBD protocol sniffer and checks it against J1939 enumerated states held in module 1302. If the Exhaust Gas Temperature Module also indicates a diesel, then the vehicle is recorded as being fuelled by diesel. If any of the Pressure And Flow Rate Module, Exhaust Gas Temperature Module or Fuel Status Type Valid indicators indicate that the vehicle uses petrol, then a petrol fuel type is recorded.

In an alternative embodiment of the Fuel Type Detector, the logic represented by the combination of AND gates 1319, 1320, OR gates 1321, 1322 and NOT gates 1323, 1324 and 1325, is replaced by a "trust level" system, wherein a percentage or other numerical indicator is used to record a confidence level that the vehicle is petrol or diesel which reflects the degree of certainty in the respective test. A higher value for the trust level will for example be assigned to the throttling test than for the fuel pressure. The trust levels are then summed and the result is compared with a threshold to determine if the vehicle is petrol or diesel fuelled.

All the factors contributing to the fuel consumption have now been set out.

The final stage of the process is the calculation of fuel consumption. In order to carry out a fuel calculation as accurately as possible, the power required to keep the engine running must also be accounted for, including the power supplied to ancillary devices, and transmission inefficiencies must also be taken into account. This is largely conventional and will not be discussed further.

There are other factors which must be taken into account however, such as braking events, for example. On a simple level, acceleration during such braking events will be negative which might prevent generation of accurate values. This is of course not the case if the vehicle has regenerative braking.

Once a total power figure, including ancillaries, has been calculated, this total power figure is divided by the transmission efficiency to produce a figure for total engine power. The total engine power is then divided by the engine efficiency and the calorific value of the fuel to produce a value for fuel consumption. In an embodiment of the invention, an additional check is provided, whereby a user input maximum power figure is used as a maximum engine power. The lesser of the calculated maximum power and the user input figure is used in the fuel calculation.

Thus a value for fuel consumption may be calculated, for example, for each period of an OBD cycle or other periods. For example fuel consumption may be calculated as a continuous process during vehicle operation. Any such fuel consumption calculations will be based on characteristics of a vehicle, characteristics of a driver, such as driver behaviour, and characteristics of a journey. The fuel consumption is therefore very specific to the vehicle, the driver, and the road conditions and provides a degree of accuracy not achieved before. Several methods are provided herein to calculate a fuel consumption so that if one of the methods cannot provide a value an alternative can replace or supplement such a value. For example, in an embodiment of the invention, upper and lower limits on fuel consumption may be established using the method based on estimation of total power usage (i.e. using equations 1 to 5). The upper and lower limits correspond to upper and lower estimates of vehicle mass, using the method illustrated in FIG. 8. The air flow method, the steps of which are illustrated in FIG. 1, may be used as the principal mechanism for fuel consumption estimation, with the upper and lower limits provided by the total power method providing appropriate "ceilings" and "floor" on fuel consumption estimation. Alternative combinations of the two methods may be used as appropriate.

Figure 14A:
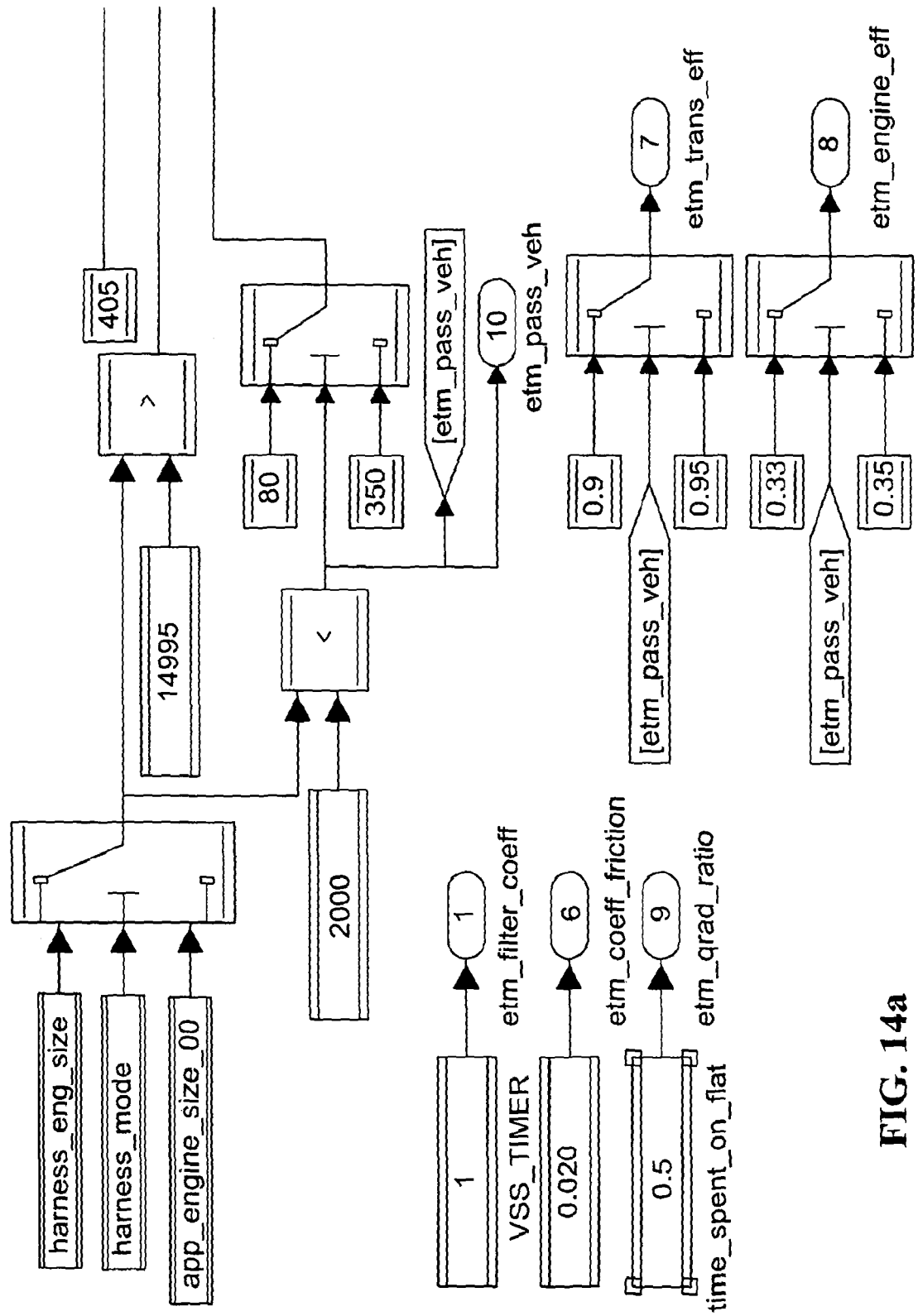
FIG. 14*a* illustrates a further embodiment of the invention.
Figure 14B:
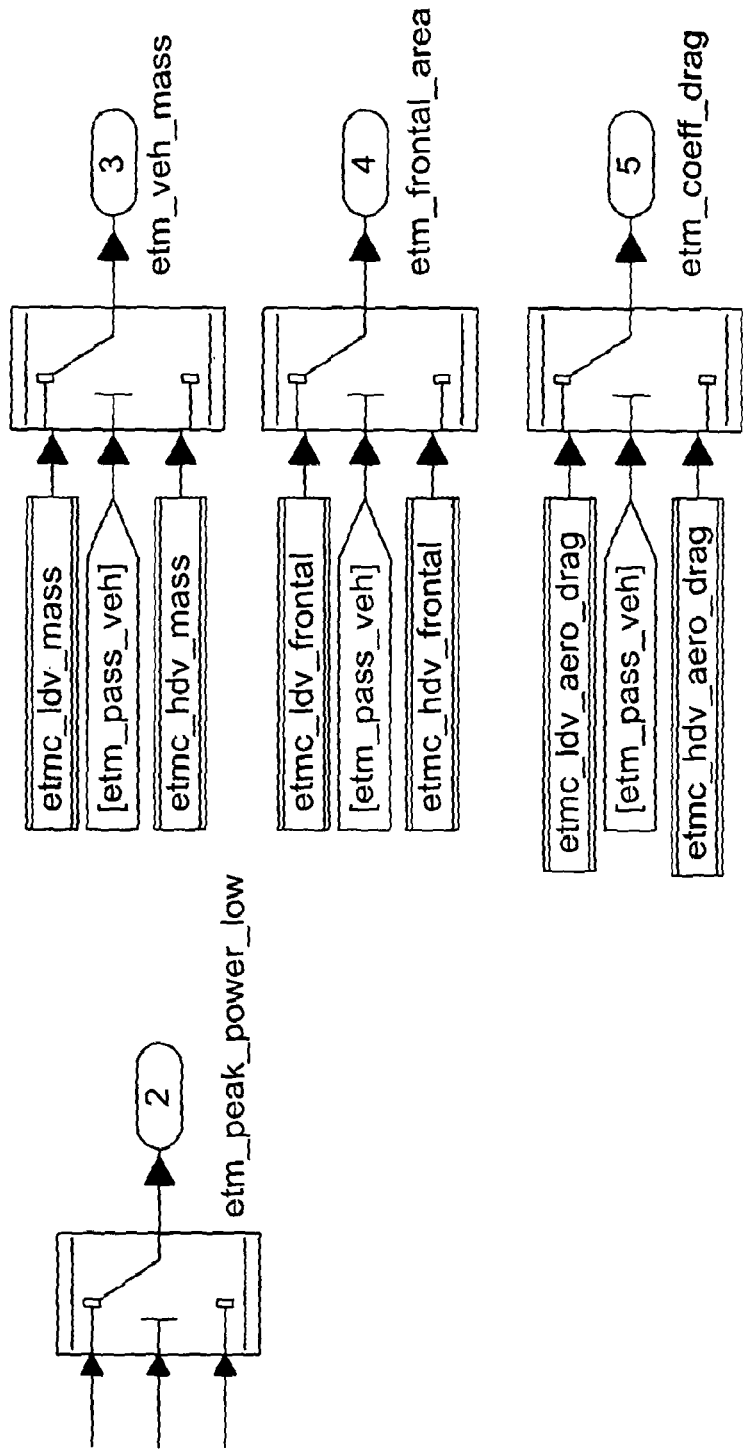
FIG. 14*b* illustrates another embodiment of the invention.
Figure 15A:
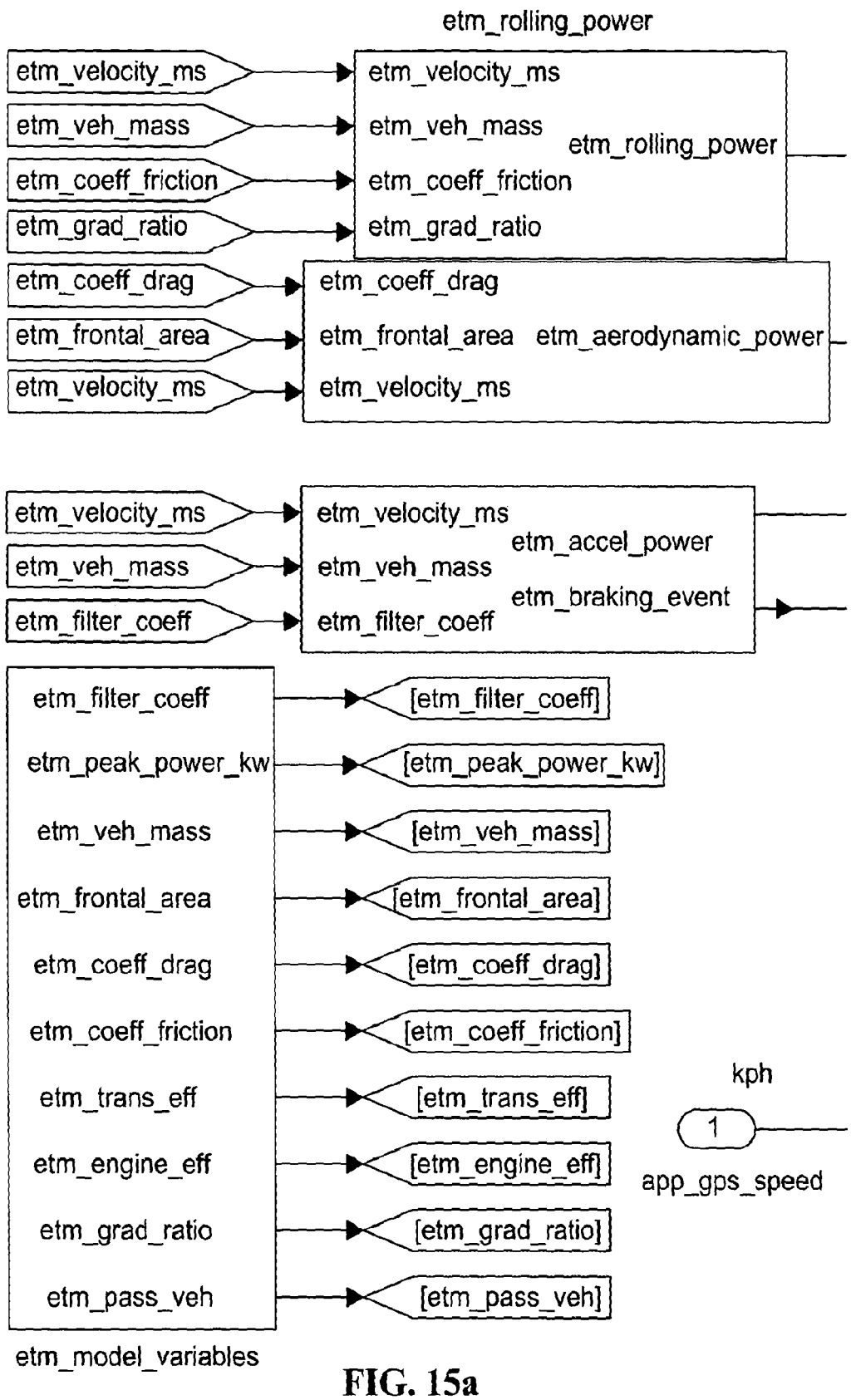
FIG. 15*a* illustrates yet another embodiment of the invention.
Figure 15B:
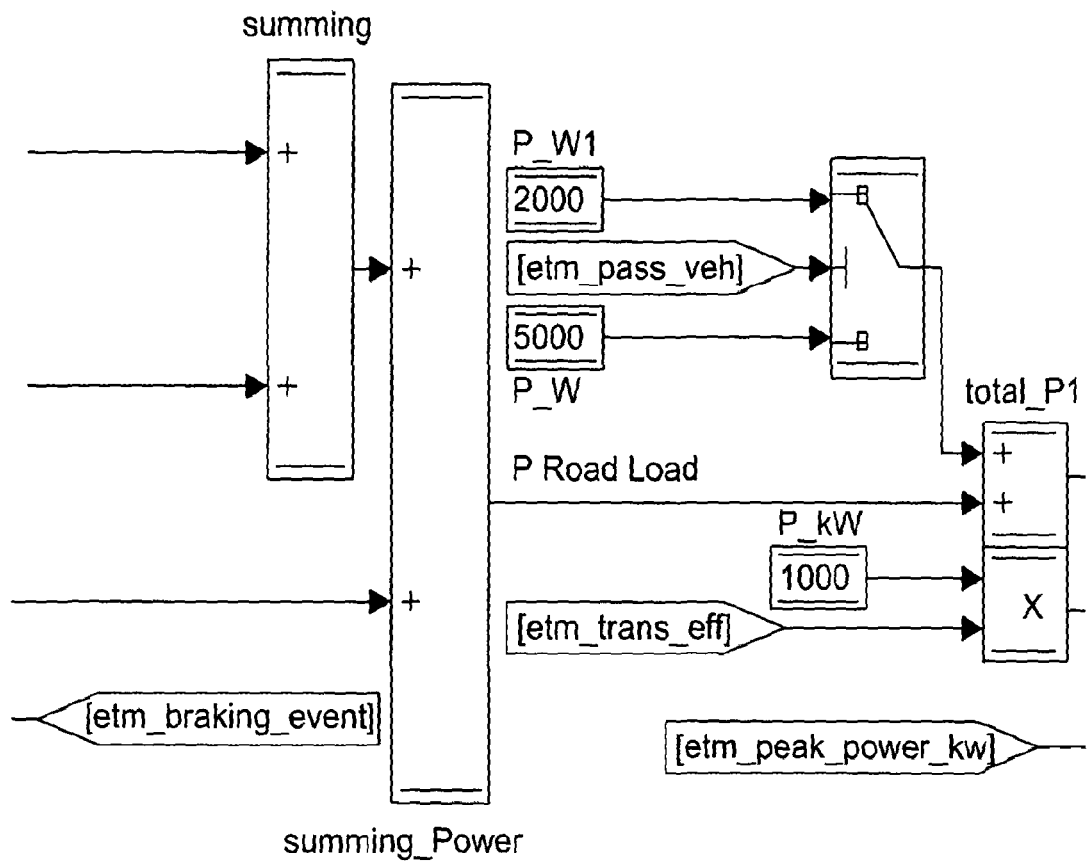
FIG. 15*b* illustrates a further embodiment of the invention.
Figure 15B:
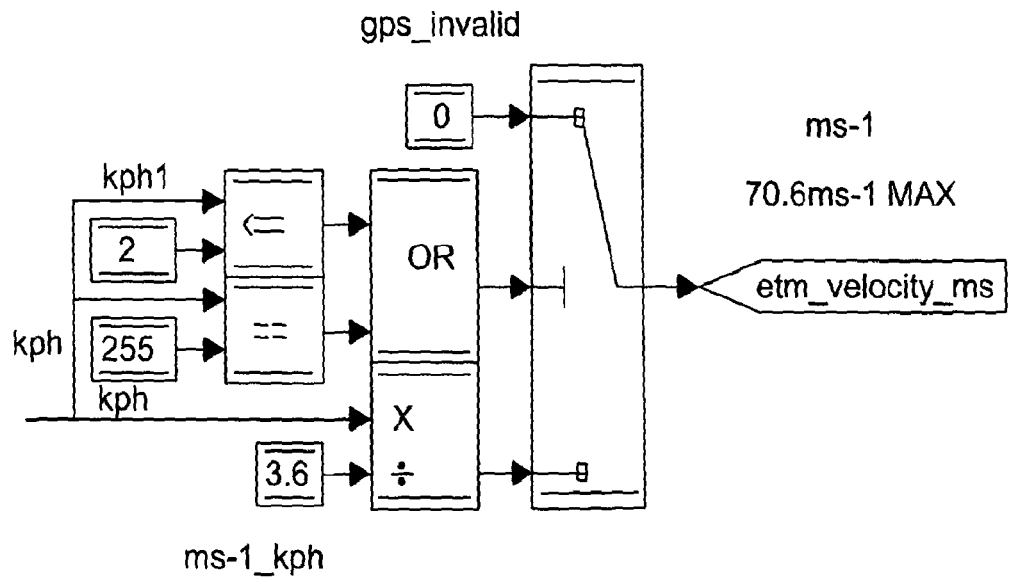
Figure 15C:
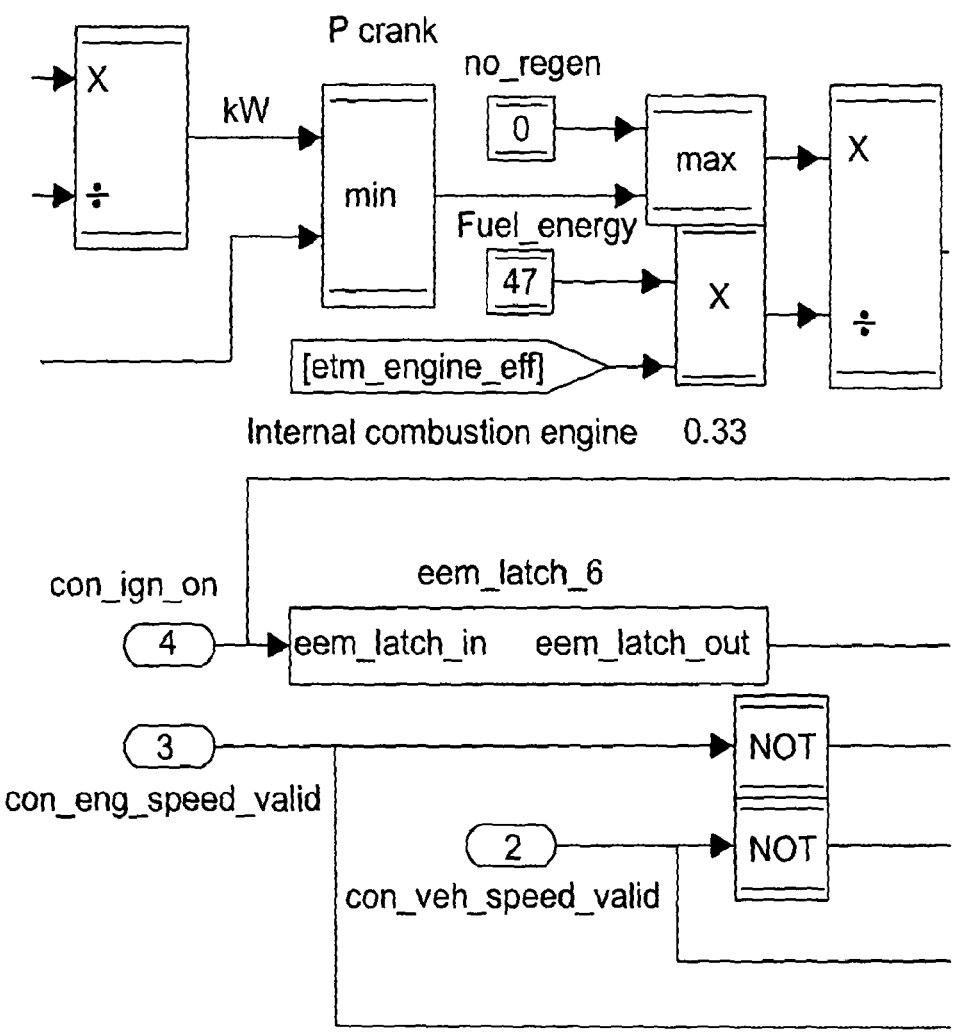
FIG. 15*c* illustrates a further embodiment of the invention.
Figure 15D:
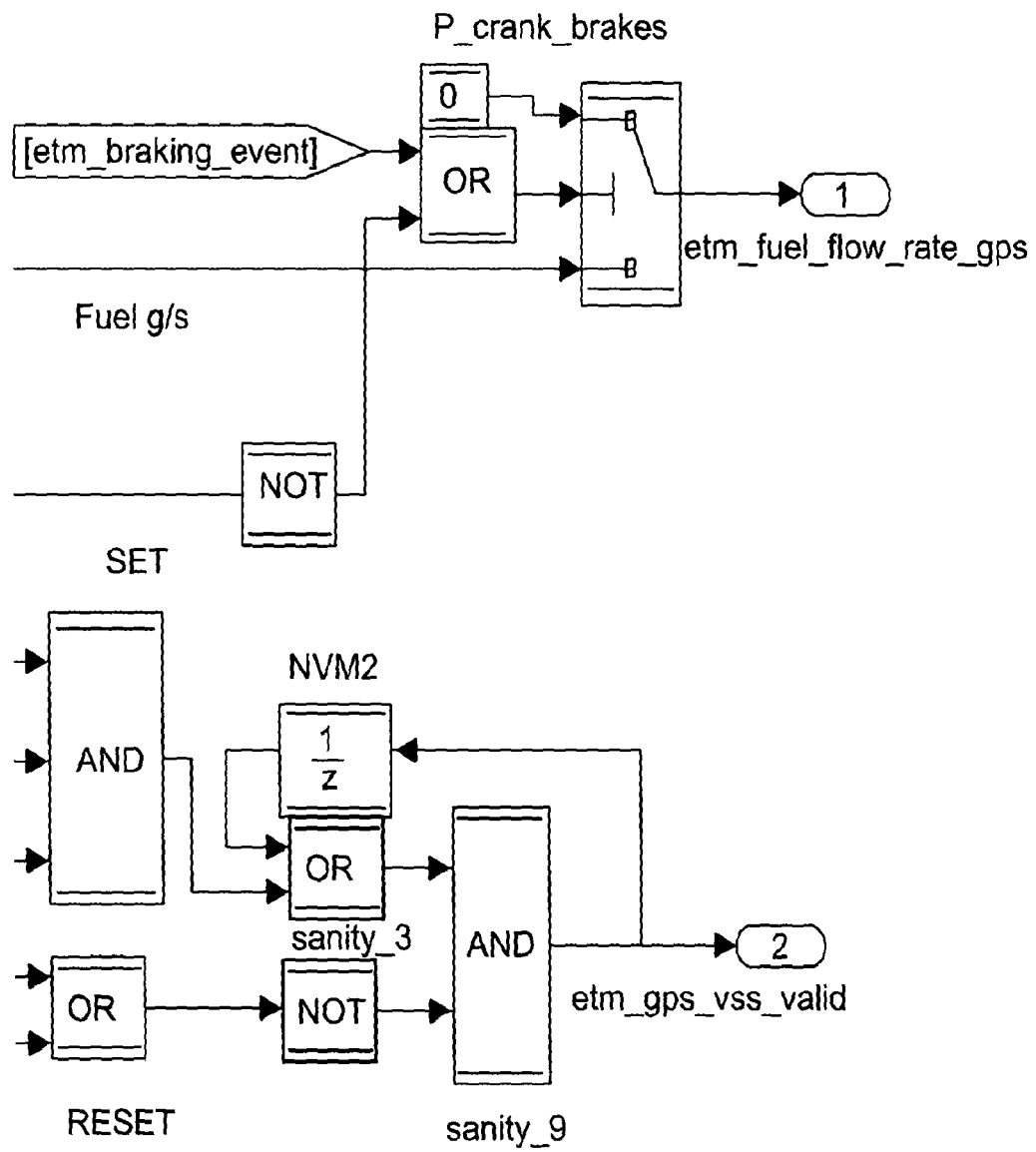
FIG. 15*d* illustrates a further embodiment of the invention.

FIGS. 14 and 15 illustrate embodiments of the system described above. Some exemplary findings from the system are given as follows.

Exemplary Findings.

During development we have relied on a variety of methods. In particular we have simulated power at the crank. Applying a transmission efficiency factor of 0.95/0.9 (light/heavy) gives apparent power at the crank. To obtain fuel we use the calorific value of the given fuel. The current model is designed for diesel only. The internal combustion engine efficiency is given as 0.33/0.35 (light/heavy).

The variable subsystem as it stands to date. This is currently an engineering release. Engine size must not exceed 1999 cc otherwise the model will load HGV settings. etm_model_variables, vehicle mass, frontal A and coefficient of drag are calibrations in the model.

This model has been designed for use with a Mercedes Actros. The Actros needs to work without any requests being broadcast over OBD. This being said, the model is designed to use only GPS speed delivered at 1 Hz from a TomTom link box via Bluetooth. The variables which must be configured for specific vehicles are as follows:

Vehicle mass (kg)
Frontal Area (m^2)
Coefficient of aero drag (Cd)
Coefficient of rolling resistance (f)
Peak power (kW)

In order to utilize this model, the following conditions must be met:

con_ign_on==True
con_eng_speed_valid==False
con_veh_speed_valid==False

With the 3 variables set as stated above, etm_gps_vss_valid is set true. The Actros needs to be identified during sniffing and then once OBD requests are halted the given conditions are met. For an MAN HGV, where engine speed is valid but VSS is not, the AOP model uses GPS for speed, but the autocal model is still used for fuelling.

In order to display fuel the TomTom Link box must observe the following:

An active OBD connection (not the NVM value but the current sniff connection)
con_ign_on==true
A Bluetooth connection with the micro.

To achieve this for the Actros, con_ign_on is set using 'vbatt'. An Actros OBD session should not be live the calibration: 'appc_gps_overide_snif_rp' should be set true when an Actros is detected and the OBD communication is terminated. Relevant code found in msg_tomtom_per_trip.c:

```
if(appc_gps_overide_snif_rp == TRUE)
{*p_dest++ = 8;}
```

For debugging this model on the bench, it is necessary to invalidate engine speed and vehicle speed, also 'app_gps_speed' is populated with the value which would normally exist as con_veh_speed. This is achieved by setting the 'appc_gps_overide_obd' TRUE. This value should always be FALSE at build time, to ensure the model performs as intended!

Debugging:

```
appc_gps_overide_snif_rp == FALSE (This value should
   not affect us as it is just for TomTom's msg)
appc_gps_overide_obd == TRUE
```

Release:

```
appc_gps_overide_snif_rp == TRUE (This value should not
   affect us as it is just for TomTom's msg)
appc_gps_overide_obd == FALSE
```

As already stated, this engineering release is Actros focused, once engine size is configured correctly and it exceeds 2 litres, the model will pick expected values for an Actros and populate the variables listed above. The model currently looks like this:

Model verification was conducted. Vehicle speed profile was recorded and chopped into 1 Hz interval (as found on a GPS reporting TomTom link box). The model has been verified by measuring expected fuel efficiency of a 1994 Citroen ZX. An expected result for this vehicle is given below:

Citroen ZX 1.9, expected=52 mpg, model result=53.02 mpg
Vehicle mass (kg)=1200 kg
Frontal Area (m^2)=2.13 m^2
Coefficient of aero drag (Cd)=0.33
Coefficient of rolling resistance (f)=0.02, (with fudge factor set to 0.5)

The model was then run using data for a Mercedes Sprinter, results given below:

Mercedes Sprinter 2.2, expected=32.7 mpg, model result=33.0 mpg
Vehicle mass (kg)=1900 kg
Frontal Area (m^2)=3.25 m^2
Coefficient of aero drag (Cd)=0.38
Coefficient of rolling resistance (f)=0.02, (with fudge factor set to 0.5)

The model was then run using data from a number of HGV tests to ensure fuel accuracy is within acceptable limits for use on a Mercedes Actros, results given below: Note that the coefficient of rolling resistance remains constant, this is intentional for all vehicle modelling.

Scania R430, expected=8.75 mpg, model result=8.32 mpg
Vehicle mass (kg)=23500 kg
Frontal Area (m^2)=10.0 m^2
Coefficient of aero drag (Cd)=0.42
Coefficient of rolling resistance (0=0.007, (with fudge factor set to 0.5)
Iveco Stralis rigid 6×2 tag axle, expected=8.77 mpg, model result=6.42 mpg
Vehicle mass (kg)=21000 kg
Frontal Area (m^2)=10.0 m^2
Coefficient of aero drag (Cd)=0.42
Coefficient of rolling resistance (f)=0.007, (with fudge factor set to 0.5)

This inaccurate result is rich due to over predicting power required for acceleration. The coca-cola cycle comprises many harsh transients. Simulating the truck empty at 10,000 kg-fuel economy is 10.99 mpg.

As an exercise, a steady state cruise simulation was conducted at 90 kph. It was found that a 10,000 kg lorry uses a simulated 3.63 g/s of diesel. An identically sized 21,000 kg lorry produces 4.49 g/s, 19% more fuel as a result of rolling friction alone. The invention is not limited to the features disclosed herein.

The invention claimed is:

1. A method for determining a type of fuel burned by an engine in a vehicle, the method comprising:
   obtaining at least two output parameters of an on board diagnostic (OBD) system of the vehicle;
   generating respective estimates of the fuel type based on the at least two output parameters, using a different fuel type identifying method for each respective estimate; and
   determining the fuel type based on the respective estimates.

2. The method of claim 1,
   further comprising assigning a weighting to each of the different fuel type identifying methods, the weighting varying according to the type of fuel identifying method, and
   wherein determining the fuel type includes summing the respective estimates with the weightings applied thereto, and comparing the sum of the weightings to a predetermined threshold.

3. The method of claim 1, further including identifying whether the engine is being throttled based upon at least one of the output parameters, wherein generating the respective estimates of the fuel type includes determining whether the fuel type is gasoline or diesel based on throttling of the engine relative to a threshold throttle level, whereby an indication is provided of a gasoline throttle level that is stronger than a diesel throttle level.

4. The method of claim 3, wherein identifying whether the engine is being throttled includes detecting whether the engine is being throttled for at least a predefined time period, and
   determining that the fuel type is gasoline in response to the engine being throttled for at least the predefined time period, and
   determining that the fuel type is diesel in response to the engine being throttled for less than the predefined time period.

5. The method of claim 3, wherein identifying whether the engine is being throttled includes comparing a manifold absolute pressure (MAP) value indicative of a manifold pressure within the engine with a threshold.

6. The method of claim 3, wherein identifying whether the engine is being throttled includes comparing air flow through the engine with a threshold corresponding to a predetermined proportion of engine capacity.

7. The method of claim 1, wherein one of the output parameters is an exhaust gas parameter, and wherein generating the respective estimates of the fuel type includes
   estimating that the fuel type is gasoline in response to the exhaust gas parameter falling within a predefined ranged indicative of a gasoline, and
   estimating that the fuel type is diesel in response to the exhaust gas parameter falling within a predefined ranged indicative of a diesel.

8. The method of claim 1, wherein one of the output parameters is fuel pressure, wherein generating the respective estimates of the fuel type includes estimating the fuel type based upon the fuel pressure.

9. The method of claim 1, wherein
   one of the output parameters is idle speed, and
   generating the respective estimates of the fuel type includes estimating the fuel type as being diesel in response to the idle speed equalling or exceeding a threshold idling speed, and estimating the fuel type as being gasoline in response to the idle speed being less than the threshold idling speed.

10. The method of claim 9,
    wherein one of the output parameters is indicative of engine temperature,
    further including setting the threshold idling speed based upon the engine temperature.

11. The method of claim 10, wherein setting the threshold idling speed includes setting the threshold based upon both the engine temperature and the size of the engine.

12. The method of claim 9, further including setting the threshold idling speed based upon the size of the engine.

13. The method of claim 9, wherein one of the output parameters is vehicle speed, wherein generating the respective estimates includes using the idle speed in response to the vehicle speed being about zero.

14. An apparatus comprising:
   a first circuit module configured and arranged to obtain at least two output parameters of an on board diagnostic (OBD) system of a vehicle having an engine that operates using a type of fuel;
   a second circuit module configured and arranged to generate respective estimates of the fuel type based on the at least two output parameters, using a different fuel type identifying method for each respective estimate; and
   a third circuit module configured and arranged to determine the fuel type based on the respective estimates.

15. The apparatus of claim 14, wherein the third circuit module is configured and arranged to
   assign a weighting to each of the different fuel type identifying methods, the weighting varying according to the type of fuel identifying method, and
   determine the fuel type by summing the respective estimates with the weightings applied thereto, and comparing the sum of the weightings to a predetermined threshold.

16. The apparatus of claim 14, wherein
   the first circuit module includes
      an idle speed circuit module configured and arranged to provide an output indicative of idle speed of the engine, and
      at least two circuit modules selected from a group of: a temperature circuit module configured and arranged to provide an output based on temperature of the engine, a fuel type circuit module configured and arranged to provide an output based on fuel type used by the engine, an engine size circuit module configured and arranged to provide an output based on size of the engine, and a combination thereof; and
   the second circuit module is configured and arranged to provide one of the respective estimates based on the output indicative of idle speed and an adjusted idle speed threshold that is based on a predefined idle speed threshold that is adjusted based on outputs of the at least two circuit modules.

17. The apparatus of claim 14, wherein the first circuit module includes at least two circuit modules selected from a group of: a temperature circuit module configured and arranged to provide an output based on temperature of the engine, a fuel type circuit module configured and arranged to provide an output based on fuel type used by the engine, an idle speed circuit module configured and arranged to provide an output indicative of idle speed of the engine, an engine size circuit module configured and arranged to provide an output based on size of the engine, and a combination thereof.

18. The apparatus of claim 14, wherein the second circuit module is configured and arranged to determine whether the engine is being throttled based upon at least one of the output parameters, and to generate the respective estimates of the fuel type by determining whether the fuel type is gasoline or diesel based on throttling of the engine relative to a threshold throttle level and a time period during which the engine is throttled, whereby an indication is provided of a gasoline throttle level that is stronger than a diesel throttle level.

19. A method for determining a fuel type of fuel burned by an engine in a vehicle, the method comprising:
   obtaining at least two output parameters of an on board diagnostic (OBD) system of the vehicle, the at least two output parameters being selected from the group consisting of a parameter indicative of whether the engine is being throttled, a parameter indicative of whether exhaust gases exhibit properties in a range corresponding to a particular fuel type, a parameter indicative of fuel pressure, and a combination thereof; and
   determining the fuel type based on the at least two output parameters.

20. The method of claim 19, wherein determining the fuel type includes:
   providing a plurality of estimates of the fuel type, each of the plurality of estimates being determined based upon at least one of the output parameters,
   assigning a weighting value to each of the plurality of estimates, with different weighting values being assigned to different ones of the estimates based upon the type of each estimate, and
   determining the fuel type based upon the plurality of estimates and the weighting values.

* * * * *